(12) United States Patent
Shiratake et al.

(10) Patent No.: US 11,434,327 B2
(45) Date of Patent: Sep. 6, 2022

(54) POLYCARBONATE RESIN, METHOD FOR PRODUCING THE SAME, AND OPTICAL LENS

(71) Applicant: MITSUBISHI GAS CHEMICAL COMPANY, INC., Tokyo (JP)

(72) Inventors: Munenori Shiratake, Ibaraki (JP); Kentaro Ishihara, Tokyo (JP); Koji Hirose, Tokyo (JP); Shinya Ikeda, Tokyo (JP); Noriyuki Kato, Tokyo (JP); Mitsuteru Kondo, Tokyo (JP); Shoko Suzuki, Tokyo (JP); Kensuke Oshima, Tokyo (JP); Shuya Nagayama, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 276 days.

(21) Appl. No.: 16/641,930

(22) PCT Filed: Aug. 29, 2018

(86) PCT No.: PCT/JP2018/031880
§ 371 (c)(1),
(2) Date: Feb. 25, 2020

(87) PCT Pub. No.: WO2019/044875
PCT Pub. Date: Mar. 7, 2019

(65) Prior Publication Data
US 2020/0181325 A1 Jun. 11, 2020

(30) Foreign Application Priority Data
Aug. 30, 2017 (JP) .............................. JP2017-165198

(51) Int. Cl.
*C08G 64/06* (2006.01)
*C08G 64/30* (2006.01)
*G02B 1/04* (2006.01)

(52) U.S. Cl.
CPC ........... *C08G 64/06* (2013.01); *C08G 64/302* (2013.01); *G02B 1/041* (2013.01)

(58) Field of Classification Search
None
See application file for complete search history.

(56) References Cited

U.S. PATENT DOCUMENTS

| | | |
|---|---|---|
| 2015/0285954 A1 | 10/2015 | Ishizuka et al. |
| 2016/0319069 A1 | 11/2016 | Shigematsu et al. |
| 2017/0044312 A1 | 2/2017 | Kato et al. |
| 2017/0051146 A1 | 2/2017 | Ishizuka et al. |

FOREIGN PATENT DOCUMENTS

| | | |
|---|---|---|
| EP | 3 489 279 A1 | 5/2019 |
| JP | 6-25398 | 2/1994 |
| JP | 10 7782 A | 1/1998 |
| JP | 11 269259 A | 10/1999 |
| JP | 2001-72872 | 3/2001 |
| JP | 2009-155253 A | 7/2009 |
| JP | 2014-185325 | 10/2014 |
| JP | 2014-185325 A | 10/2014 |
| JP | 2017-179323 | 10/2017 |
| WO | 2007/142149 | 12/2007 |
| WO | 2014/073496 | 5/2014 |
| WO | 2015/129921 | 9/2015 |
| WO | 2015/166951 | 11/2015 |
| WO | 2015/170691 | 11/2015 |
| WO | 2017/078074 A1 | 5/2017 |
| WO | 2018/016516 | 1/2018 |

OTHER PUBLICATIONS

Official Communication (ISR—210) issued in International Patent Application No. PCT/JP2018/031880, dated Nov. 13, 2018.
Office Action issued in Chinese Patent Application No. 201880056382.6 dated Nov. 3, 2021; Not in English, but Applicant notes that cited documents are categorized as "X", "Y", "A", etc.
Extended European Search Report issued in European Patent Application No. 18851340.2, dated Aug. 24, 2020.
Toshikazu Takata et al.: "Optically Active Poly(aryl carbonates) Consisting of Axially Chiral Units. Chiral Binaphthyl Group Induced Helical Polymer ", Journal of the American Chemical Society, vol. 120, No. 18, May 1, 1998, pp. 4530-4531, XP055234222, US.
Office Action issued in corresponding Taiwanese Patent Application No. 107130107 dated Dec. 28, 2021. Although most of the document is not in English, the Examiner is requested to consider the search report format at the end of the document, which lists citations in standard categories ("X", "Y", etc.).

Primary Examiner — Terressa Boykin
(74) Attorney, Agent, or Firm — Greenblum & Bernstein, P.L.C.

(57) ABSTRACT

A polycarbonate resin having a high refractive index, a low Abbe number and a high moisture and heat resistance is provided. In an embodiment, a polycarbonate resin including a structural unit represented by general formula (1) below is provided.

[Chemical formula 1]

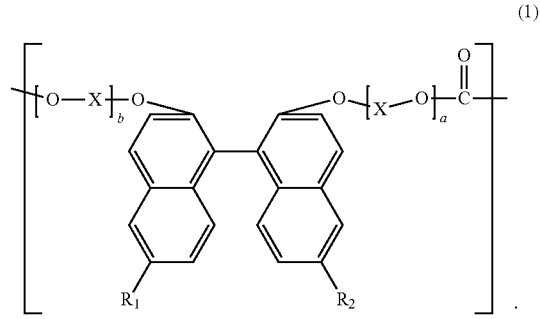

(1)

27 Claims, 1 Drawing Sheet

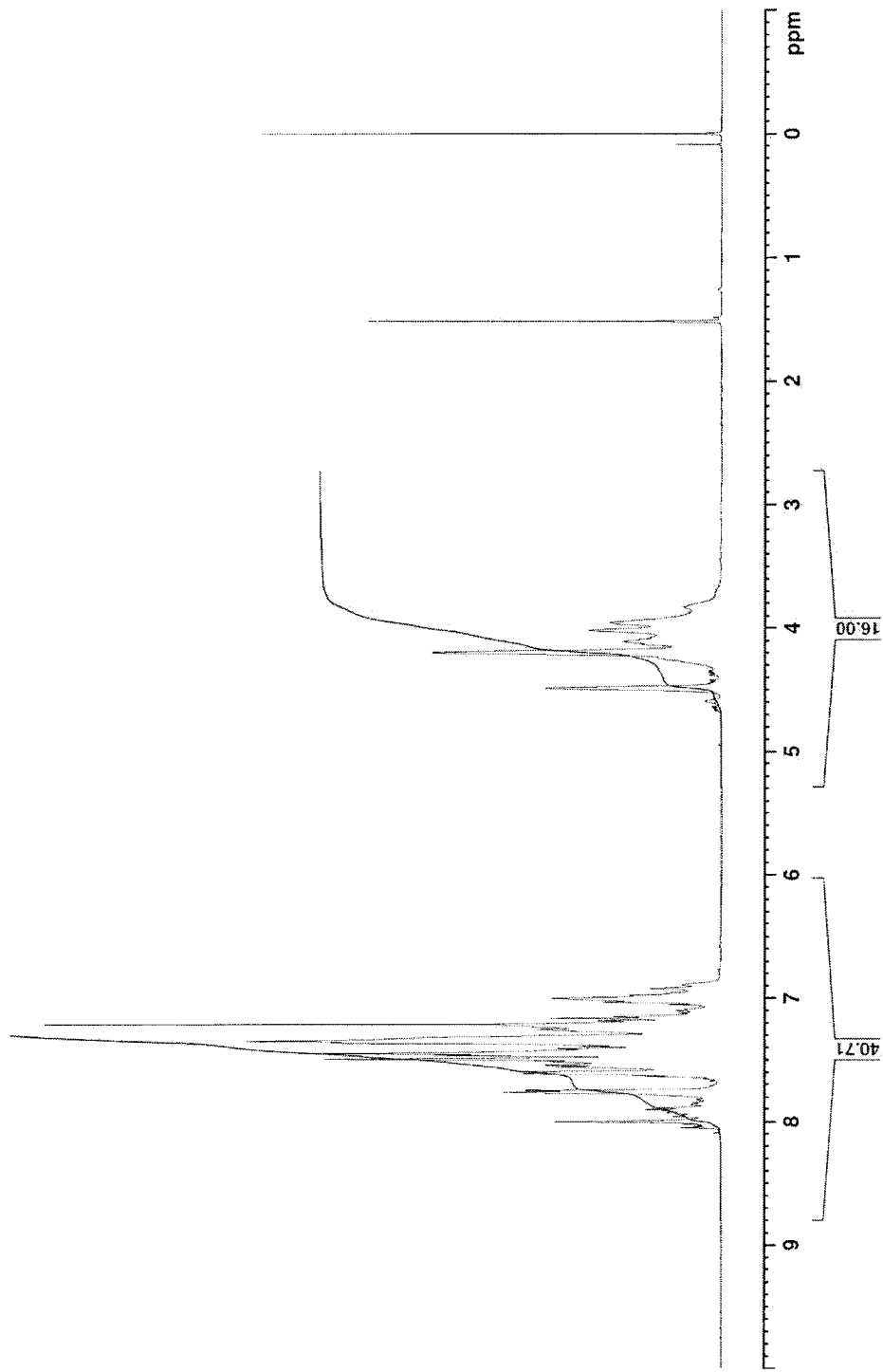

POLYCARBONATE RESIN, METHOD FOR PRODUCING THE SAME, AND OPTICAL LENS

TECHNICAL FIELD

The present invention relates to a polycarbonate resin and a method for producing the same, and also relates to an optical lens including the polycarbonate resin.

BACKGROUND ART

As a material of an optical lens usable for an optical system of any of various types of cameras such as a camera, a camera having a film integrated therewith, a video camera and the like, optical glass or an optical resin are used. Optical glass is superb in heat resistance, transparency, size stability, chemical resistance and the like, but has problems that the material cost is high, the moldability is low, and the productivity is low.

In the meantime, an optical lens formed of an optical resin has an advantage that mass-production is possible by injection molding. For example, a polycarbonate resin or the like is used for a lens for camera. However, as products are decreased in weight, thickness, length and size recently, development of a resin having a high refractive index is desired. In general, in the case where an optical material having a high refractive index is used, a lens element having the same refractive index is realized with a surface having a small curvature. Therefore, the aberration caused to the plane is decreased. This allows the number of required lenses to be decreased, allows the eccentricity sensitivity of the lenses to be lowered, or allows the thickness of the lenses to be decreased and thus to decrease the weight thereof.

In general, in an optical system of a camera, the aberration correction is performed by a combination of a plurality of concave and convex lenses. More specifically, a convex lens having a color aberration is combined with a concave lens having a color aberration of an opposite sign to that of the convex lens, so that the color aberration of the convex lens is synthetically cancelled. In this case, the concave lens is required to be highly dispersive (namely, to have a low Abbe number).

In such circumstances, a resin for an optical lens having a low Abbe number has been developed. For example, a copolymer including a bisphenol A type polycarbonate structural unit is disclosed in Patent Document 1 as improving the refractive index. In an example of Patent Document 1, it is described that the refractive index reaches 1.62 to 1.64 and the that Abbe number reaches 23 through 26.

Patent Document 2 discloses a copolymer of a polycarbonate resin including a structural unit including a fluorene structure and bisphenol A. In an example of this document, it is described that the refractive index reaches 1.616 to 1.636. A polycarbonate copolymer disclosed in Patent Document 3 does not realize a sufficiently high refractive index, either.

As described above, a polycarbonate resin and an optical lens having a high refractive index and a low Abbe number have not been provided yet.

In addition, recently, various electronic devices are required to have moisture resistance and heat resistance. As an environmental test to evaluate the moisture resistance and the heat resistance of such electronic devices, a "PCT test" (pressure cooker test" is now performed. This test is a moisture and heat resistance test. Entrance of moisture into a sample is accelerated time-wise to evaluate the moisture resistance and the heat resistance. Therefore, an optical lens formed of an optical resin useable for an electronic device needs to have a high refractive index and a low Abbe number, and is also required to maintain high optical properties even after the PCT test.

PRIOR ART DOCUMENTS

Patent Documents

Patent Document 1: WO2007/142149
Patent Document 2: Japanese Laid-Open Patent Publication No. Hei 6-25398
Patent Document 3: Japanese Laid-Open Patent Publication No. 2014-185325

SUMMARY OF THE INVENTION

Problem to be Solved by the Inventions

An object of the present invention is to provide a polycarbonate resin having a high refractive index, a low Abbe number and a high moisture and heat resistance, especially, a high refractive index. The present invention also has an object of providing a superb optical lens by use of such a polycarbonate resin.

Solution to Problem

As a result of actively accumulating studies in order to achieve the above-described objects, the present inventors have found that the following polycarbonate resin and optical lens achieve the above-described objects, and thus realized the present invention.

The present invention is, for example, as follows.
[1] A polycarbonate resin including a structural unit represented by general formula (1) below:

[Chemical formula 1]

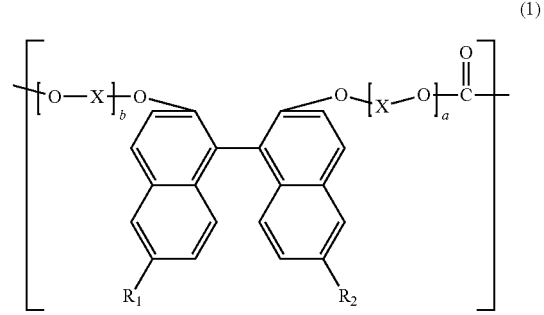

(where $R_1$ and $R_2$ independently represent a hydrogen atom, a fluorine atom, a chlorine atom, a bromine atom, an iodine atom, an alkyl group having a carbon number of 1 to 6, a mono- or polycyclic aryl group having a carbon number of 6 to 36, a mono- or polycyclic hetaryl having a total of 5 to 36 atoms, which are ring members, where 1, 2, 3 or 4 of these atoms are selected from nitrogen, sulfur and oxygen, while the remainder of these atoms are carbon atoms, an alkenyl group having a carbon number of 2 to 6, an alkoxy group having a carbon number of 1 to 6, or an aralkyl group having a carbon number of 7 to 17, where mono- or polycyclic aryl and mono- or polycyclic hetaryl are unsubstituted or carry 1 or 2 radicals $R^a$, which are selected from the group consisting of CN, $CH_3$, $OCH_3$, O-phenyl, O-naphthyl, S-phenyl, S-naphthyl and halogen, where $R_1$ and $R_2$ are not all a hydrogen atom;

X represents an alkylene group having a carbon number of 1 to 8, a cycloalkylene group having a carbon number of 5 to 12 or an arylene group having a carbon number of 6 to 20;

where alkylene group and cycloalkylene group are unsubstituted or carry a phenyl ring, and a and b are each an integer of 1 to 10).

[2] The polycarbonate resin according to [1] above, wherein the polycarbonate resin includes at least 50 mol % of the structural unit represented by general formula (1).

[3] The polycarbonate resin according to [1] or [2] above, wherein at least one of $R_1$ and $R_2$ in general formula (1) is an aryl group having a carbon number of 6 to 20.

[4] The polycarbonate resin according to [3] above, wherein at least two of $R_1$ and $R_2$ in general formula (1) are each an aryl group having a carbon number of 6 to 14.

[5] The polycarbonate resin according to any one of [1] through [4] above, wherein the structural unit represented by general formula (1) includes at least any one of structural units represented by general formulas (A-1) through (A-4) below:

[Chemical formula 2]

(A-1)

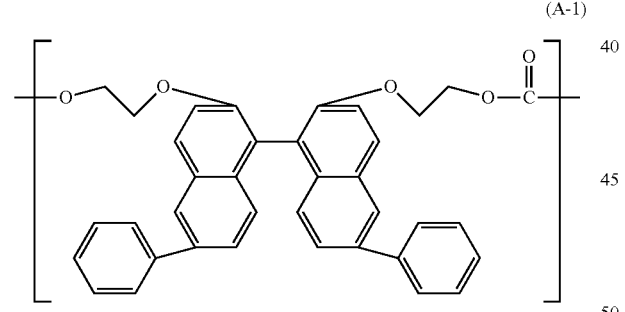

[Chemical formula 3]

(A-2)

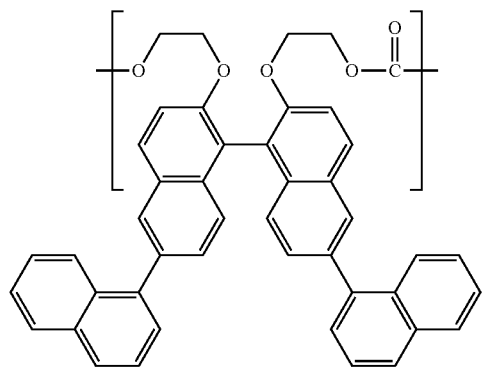

[Chemical formula 4]

(A-3)

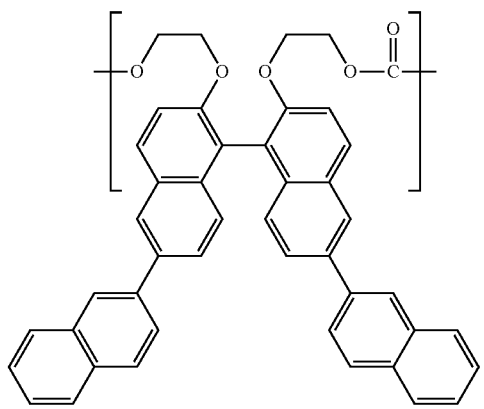

[Chemical formula 5]

(A-4)

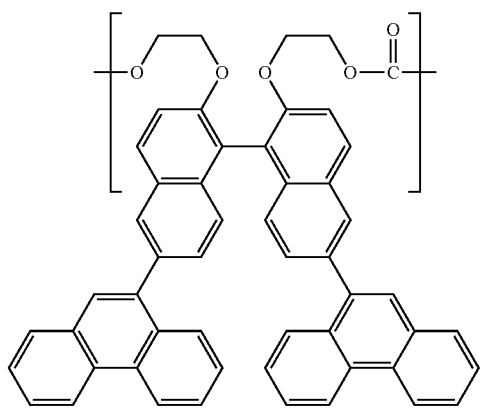

[Chemical formula 6]

(A-5)

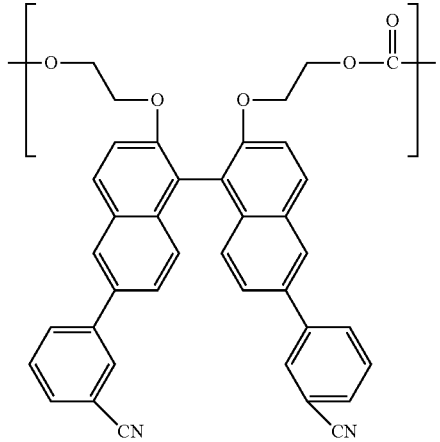

[Chemical formula 7]

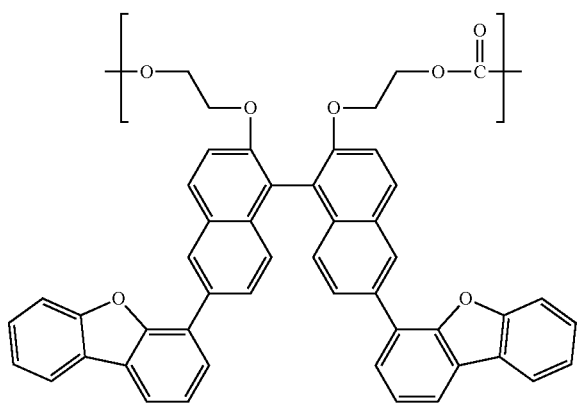
(A-6)

[Chemical formula 8]

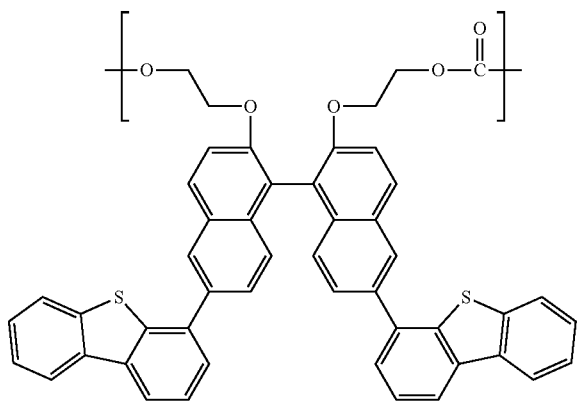
(A-7)

[6] The polycarbonate resin according to any one of [1] through [5] above, further comprising at least one of structural units represented by general formulas (2) and (3) below:

[Chemical formula 9]

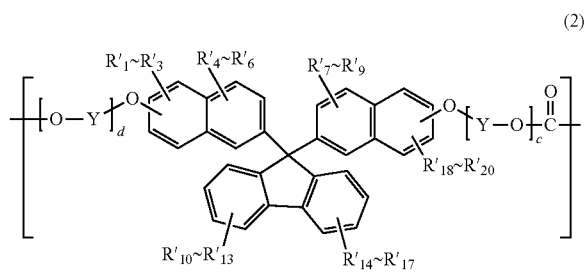
(2)

(where $R'_1$ through $R'_{20}$ independently represent a hydrogen atom, a fluorine atom, a chlorine atom, a bromine atom, an iodine atom, an alkyl group having a carbon number of 1 to 6, an aryl group having a carbon number of 6 to 12, an alkenyl group having a carbon number of 2 to 6, an alkoxy group having a carbon number of 1 to 6, or an aralkyl group having a carbon number of 7 to 17;

Y represents an alkylene group having a carbon number of 1 to 8, a cycloalkylene group having a carbon number of 5 to 12, or an arylene group having a carbon number of 6 to 20; and c and d are each an integer of 1 to 10);

[Chemical formula 10]

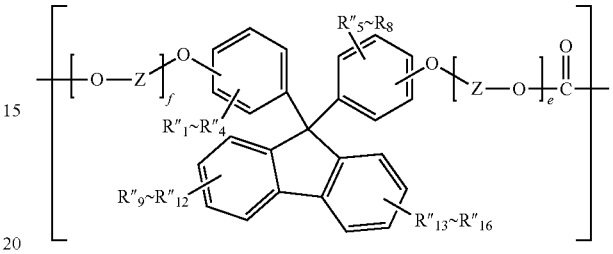
(3)

(where $R''_1$ through $R''_{16}$ independently represent a hydrogen atom, a fluorine atom, a chlorine atom, a bromine atom, an iodine atom, an alkyl group having a carbon number of 1 to 6, an aryl group having a carbon number of 6 to 12, an alkenyl group having a carbon number of 2 to 6, an alkoxy group having a carbon number of 1 to 6, or an aralkyl group having a carbon number of 7 to 17;

Z represents an alkylene group having a carbon number of 1 to 8, a cycloalkylene group having a carbon number of 5 to 12, or an arylene group having a carbon number of 6 to 20; and e and f are each an integer of 1 to 10).

[7] The polycarbonate resin according to [6] above, wherein the polycarbonate resin includes a copolymer that includes at least a structural unit represented by general formula (1) and a structural unit represented by general formula (2).

[8] The polycarbonate resin according to [7] above, wherein the copolymer includes a structural unit represented by general formula (3-1) below:

[Chemical formula 11]

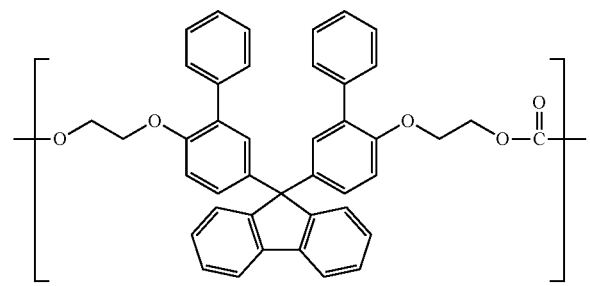
(3-1)

[9] The polycarbonate resin according to [6] above, wherein the polycarbonate resin includes a copolymer that includes at least a structural unit represented by general formula (1) and a structural unit represented by general formula (3).

[10] The polycarbonate resin according to [9] above, wherein the copolymer includes a structural unit represented by general formula (2-1) below:

[Chemical formula 12]

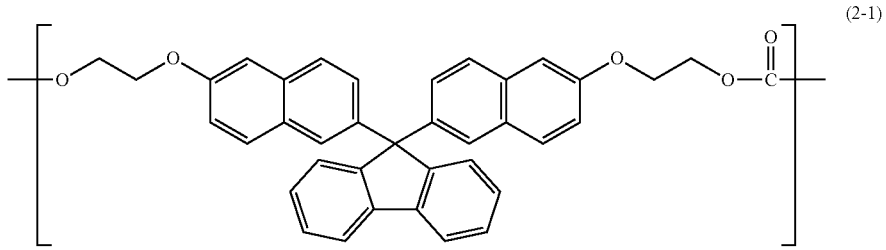

[11] The polycarbonate resin according to any one of [1] through [10] above, wherein the polycarbonate resin includes 20 to 80 mol % of the structural units represented by general formulas (1) and (2) in total.

[12] The polycarbonate resin according to any one of [1] through [11] above, wherein further comprising at least one structural unit represented by general formula (4) below:

[Chemical formula 13]

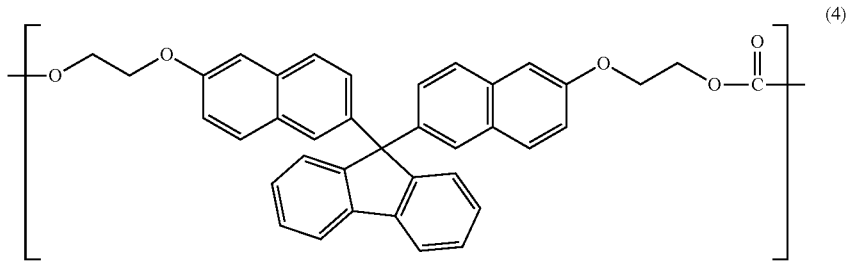

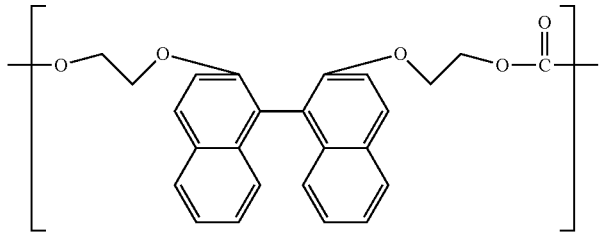

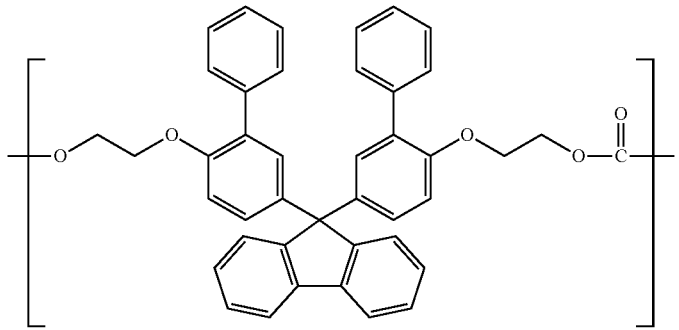

[13] The polycarbonate resin according to [12] above, wherein the polycarbonate resin includes at least a structural unit of BNEF (9,9-bis(6-(2-hydroxyethoxy)naphthalene-2-yl)fluorene).

[14] The polycarbonate resin according to [12] above, wherein the polycarbonate resin includes at least a structural unit of 2,2'-bis(2-hydroxyethoxy)-1,1'-binaphthalene.

[15] The polycarbonate resin according to [12] above, further comprising at least a structural unit of BPPEF (9,9-bis(4-(2-hydroxyethoxy)-3-phenylphenyl)fluorene).

[16] The polycarbonate resin according to any one of [1] through [15], wherein the aryl group is selected from pyrenyl group, furanyl group, benzodioxanyl group, dihydrobenzofuranyl group, piperonyl group, benzofuranyl group, dibenzofuranyl group, pyrrolidinyl group, isoquinolyl group, pyrimidinyl group, and carbazole group, which may be substituted by an alkyl group having a carbon number of 1 to 6, an alkoxy group having a carbon number of 1 to 6, or an aryl group having a carbon number of 6 to 16.

[17] The polycarbonate resin according to any one of [1] through [16] above, wherein the polycarbonate resin has a value of refractive index of 1.655 or greater.
[18] The polycarbonate resin according to any one of [1] through [17], where $R_1$ and $R_2$ are identical.
[19] The polycarbonate resin according to any one of [1] through [17], where $R_1$ and $R_2$ are identical or different and selected from mono- or polycyclic aryl having from 6 to 36 carbon atoms and mono- or polycyclic hetaryl having a total of 5 to 36 atoms, which are ring members, where 1, 2, 3 or 4 of these atoms are selected from nitrogen, sulfur and oxygen, while the remainder of these atoms are carbon atoms,
where mono- or polycyclic aryl and mono- or polycyclic hetaryl are unsubstituted.
[20] The polycarbonate resin according to any one of [1] through [19], where $R_1$ and $R_2$ are selected from the group consisting of
azulenyl,
indenyl, which is unsubstituted or substituted by 1, 2, 3, 4 or 5 radicals selected from phenyl and polycyclic aryl bearing bearing 2, 3 or 4 phenyl rings, which are linked to each other via a single bond, directly fused to each other and/or fused to a saturated or unsaturated 4- to 10-membered mono- or bicyclic hydrocarbon ring;
phenyl, which is unsubstituted;
phenyl, which is substituted by 1 or 2 CN radicals;
phenyl, which is substituted by 1, 2, 3, 4 or 5 radicals selected from phenyl and polycyclic aryl bearing bearing 2, 3 or 4 phenyl rings, which are linked to each other via a single bond, directly fused to each other and/or fused to a saturated or unsaturated 4- to 10-membered mono- or bicyclic hydrocarbon ring; and
polycyclic aryl bearing 2, 3 or 4 phenyl rings, which are directly fused to each other and/or fused to a saturated or unsaturated 4- to 10-membered mono- or bicyclic hydrocarbon ring, where polycyclic aryl is unsubstituted or substituted by 1 or 2 radicals selected from phenyl and polycyclic aryl bearing 2 or 3 phenyl rings, which are linked to each other via a single bond, directly fused to each other and/or fused to a saturated 4- to 10-membered mono- or bicyclic hydrocarbon ring, where the phenyl rings of polycyclic aryl are unsubstituted or carry 1 or 2 radicals Ra.
[21] The polycarbonate resin according to any one of [1] through 1201, where $R_1$ and $R_2$ are selected from the group consisting of
phenyl, which is unsubstituted or substituted by 1, 2, 3, 4 or 5 phenyl radicals,
phenyl, which is substituted by 1 or 2 CN radicals,
phenyl, which is substituted by 1 or 2 polycyclic aryl radicals selected from biphenyl, naphthyl, fluorenyl, anthracenyl, phenanthryl and pyrenyl and optionally by 1 further phenyl radical;
naphthyl, which is unsubstituted or substituted by 1 or 2 radicals selected from CN, phenyl and polycyclic aryl selected from biphenyl, naphthyl, fluorenyl, anthracenyl, phenanthryl and pyrenyl;
biphenylenyl;
triphenylenyl;
tetraphenylenyl;
phenanthryl;
pyrenyl;
9H-fluorenyl;
dibenzo[a,e][8]annulenyl;
perylenyl; and
9,9'-spirobi[9H-fluoren]yl.

[22] The polycarbonate resin according to [21], where $R_1$ and $R_2$ are selected from the group consisting of phenyl, 2-cyanophenyl, 3-cyanophenyl, 4-cyanophenyl, 2-naphthyl, 1-naphthyl, and 9-phenanthryl.
[23] The polycarbonate resin according to any one of [1] through [19], where $R_1$ and $R_2$ are selected from the group consisting of
heteroaromatic monocyclic radicals having 5 or 6 ring atoms, which comprise 1, 2, 3 or 4 nitrogen atoms or 1 oxygen atom and 0, 1, 2 or 3 nitrogen atoms or 1 sulfur atom and 0, 1, 2 or 3 nitrogen atoms, where the remainder of the ring atoms are carbon atoms,
heteroaromatic polycyclic radicals, which bear a heteroaromatic monocycle as defined above and 1, 2, 3, 4 or 5 further aromatic rings selected from phenyl and heteroaromatic monocycles, where the (hetero)aromatic rings of polycyclic hetaryl are linked to each other by a covalent bond or fused to each other directly and/or fused to a saturated or unsaturated 4 to 10-membered mono- or bicyclic hydrocarbon ring; and
heteroaromatic polycyclic radicals, which bear at least one saturated or partially unsaturated 5- or 6-membered heterocyclic ring bearing 1 or 2 heteroatoms selected from oxygen, sulfur and nitrogen as ring atoms, and 1, 2, 3, 4 or 5 further aromatic rings selected from phenyl and heteroaromatic monocycles as defined above, where at least one of the further aromatic rings is directly fused to the saturated or partially unsaturated 5- or 6-membered heterocyclic radical and where the remainder of further aromatic rings of polycyclic hetaryl are linked to each other by a covalent bond or fused to each other directly and/or fused to a saturated or unsaturated 4 to 10-membered mono- or bicyclic hydrocarbon ring.
[24] The polycarbonate resin according to [23], where $R_1$ and $R_2$ are selected from the group consisting of furyl, thienyl, pyrrolyl, imidazolyl, pyrazolyl, 1,2,3-triazolyl, 1,2,4-triazolyl, tetrazolyl, oxazolyl, isoxazolyl, 1,3,4-oxadiazolyl, 1,2,4-oxadiazolyl, pyridyl, pyrazinyl, pyridazinyl, pyrimidinyl, triazinyl, benzofuryl, dibenzofuranyl, benzothienyl, dibenzothienyl, thianthrenyl, naphthofuryl, furo[3,2-b]furanyl, furo[2,3-b]furanyl, furo[3,4-b]furanyl, oxanthrenyl, indolyl, isoindolyl, carbazolyl, indolizinyl, benzopyrazolyl, benzimidazolyl, benzoxazolyl, benzo[cd]indolyl, 1H-benzo[g]indolyl, quinolinyl, isoquinolinyl, acridinyl, phenazinyl, quinazolinyl, quinoxalinyl, phenoxazinyl, benzo[b][1,5]naphthyridinyl, cinnolinyl, 1,5-naphthyridinyl, 1,8-naphthyridinyl, phenylpyrrolyl, naphthylpyrrolyl, dipyridyl, phenylpyridyl, naphthylpyridyl, pyrido[4,3-b]indolyl, pyrido[3,2-b]indolyl, pyrido[3,2-g]quinolinyl, pyrido[2,3-b][1,8]naphthyridinyl, pyrrolo[3,2-b]pyridinyl, pteridinyl, puryl, 9H-xanthenyl, 2H-chromenyl, phenanthridinyl, phenanthrolinyl, furo[3,2-f][1]benzofuranyl, furo[2,3-f][1]benzofuranyl, furo[3,2-g]quinolinyl, furo[2,3-g]quinolinyl, furo[2,3-g]quinoxalinyl, benzo[g]chromenyl, pyrrolo[3,2,1-hi]indolyl, benzo[g]quinoxalinyl, benzo[f]quinoxalinyl, and benzo[h]isoquinolinyl.
[25] The polycarbonate resin according to any one of [1] through [24], where X is ethylene group.
[26] An optical lens, comprising the polycarbonate resin according to any one of [1] through [25] above.
[27] A method for producing the polycarbonate resin of any one of [1] through [25] above, including a step of performing melt polycondensation of a dihydroxy compound represented by general formula (5) and a carbonate diester.

[Chemical formula 14]

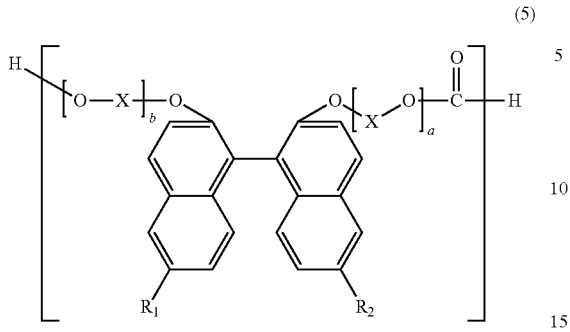

(5)

[Chemical formula 15]

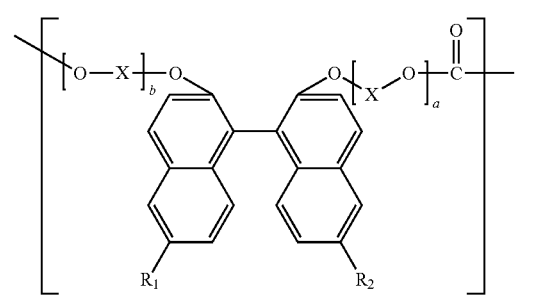

(1)

(in formula (5), $R_1$ and $R_2$ independently represent a hydrogen atom, a fluorine atom, a chlorine atom, a bromine atom, an iodine atom, an alkyl group having a carbon number of 1 to 6, a mono- or polycyclic hetaryl aryl group having a carbon number of 6 to 36, a mono- or polycyclic hetaryl having a total of 5 to 36 atoms, which are ring members, where 1, 2, 3 or 4 of these atoms are selected from nitrogen, sulfur and oxygen, while the remainder of these atoms are carbon atoms, an alkenyl group having a carbon number of 2 to 6, an alkoxy group having a carbon number of 1 to 6, or an aralkyl group having a carbon number of 7 to 17, where mono- or polycyclic aryl and mono- or polycyclic hetaryl are unsubstituted or carry 1 or 2 radicals $R^a$, which are selected from the group consisting of CN, $CH_3$, $OCH_3$, O-phenyl, O-naphthyl, S-phenyl, S-naphthyl and halogen, where $R_1$ and $R_2$ are not all a hydrogen atom;

X represents an alkylene group having a carbon number of 1 to 8, a cycloalkylene group having a carbon number of 5 to 12 or an arylene group having a carbon number of 6 to 20;

where alkylene group and cycloalkylene group are unsubstituted or carry a phenyl ring, and where a and b are each an integer of 1 to 10).

Effects of the Invention

The polycarbonate resin according to the present invention has a high refractive index, a low Abbe number and a high moisture and heat resistance, especially, a high refractive index. By use of such a polycarbonate resin, a superb optical lens is provided.

BRIEF DESCRIPTION OF DRAWINGS

FIG. 1 is an H1-NMR chart of a resin produced in example 2-B.

DESCRIPTION OF EMBODIMENTS

Hereinafter, the present invention will be described in detail.
(1) Components of the Polycarbonate Resin (Structural Unit)

A polycarbonate resin according to the present invention includes a structural unit represented by general formula (1) below:

(in formula (1), $R_1$ and $R_2$ independently represent a hydrogen atom, a fluorine atom, a chlorine atom, a bromine atom, an iodine atom, an alkyl group having a carbon number of 1 to 6, a mono- or polycyclic hetaryl aryl group having a carbon number of 6 to 36, a mono- or polycyclic hetaryl having a total of 5 to 36 atoms, which are ring members, where 1, 2, 3 or 4 of these atoms are selected from nitrogen, sulfur and oxygen, while the remainder of these atoms are carbon atoms, an alkenyl group having a carbon number of 2 to 6, an alkoxy group having a carbon number of 1 to 6, or an aralkyl group having a carbon number of 7 to 17, where mono- or polycyclic aryl and mono- or polycyclic hetaryl are unsubstituted or carry 1 or 2 radicals $R^a$, which are selected from the group consisting of CN, $CH_3$, $OCH_3$, O-phenyl, O-naphthyl, S-phenyl, S-naphthyl and halogen, where $R_1$ and $R_2$ are not all a hydrogen atom;

X represents an alkylene group having a carbon number of 1 to 8, a cycloalkylene group having a carbon number of 5 to 12 or an arylene group having a carbon number of 6 to 20;

where alkylene group and cycloalkylene group are unsubstituted or carry a phenyl ring, and a and b are each an integer of 1 to 10).

In general formula (1) above, $R_1$ and $R_2$ are independently preferably a hydrogen atom, an alkyl group having a carbon number of 1 to 4, an aryl group having a carbon number of 6 to 30, an alkenyl group having a carbon number of 2 to 4, an alkoxy group having a carbon number of 1 to 4, or an aralkyl group having a carbon number of 7 to 12; more preferably an aryl group having a carbon number of 6 to 20; and still more preferably an aryl group having a carbon number of 6 to 14. At least one of $R_1$ through Rio in general formula (1) is preferably an aryl group having a carbon number of 6 to 20, and more preferably an aryl group having a carbon number of 6 to 14. Especially preferably, at least two of $R_1$ through Rio are each an aryl group having a carbon number of 6 to 14 or a carbon number of 6 to 12.

$R_1$ and $R_2$ are for example, identical. $R_1$ and $R_2$ may be identical or different and selected from mono- or polycyclic aryl having from 6 to 36 carbon atoms and mono- or polycyclic hetaryl having a total of 5 to 36 atoms, which are ring members, where 1, 2, 3 or 4 of these atoms are selected from nitrogen, sulfur and oxygen, while the remainder of these atoms are carbon atoms. Here, the mono- or polycyclic aryl and mono- or polycyclic hetaryl may be unsubstituted.

$R_1$ and $R_2$ may be selected from the group consisting of azulenyl,
indenyl, which is unsubstituted or substituted by 1, 2, 3, 4 or 5 radicals selected from phenyl and polycyclic aryl bearing bearing 2, 3 or 4 phenyl rings, which are linked to each other via a single bond, directly fused to each other and/or fused to a saturated or unsaturated 4- to 10-membered mono- or bicyclic hydrocarbon ring;
phenyl, which is unsubstituted;
phenyl, which is substituted by 1 or 2 CN radicals;
phenyl, which is substituted by 1, 2, 3, 4 or 5 radicals selected from phenyl and polycyclic aryl bearing bearing 2, 3 or 4 phenyl rings, which are linked to each other via a single bond, directly fused to each other and/or fused to a saturated or unsaturated 4- to 10-membered mono- or bicyclic hydrocarbon ring; and
polycyclic aryl bearing 2, 3 or 4 phenyl rings, which are directly fused to each other and/or fused to a saturated or unsaturated 4- to 10-membered mono- or bicyclic hydrocarbon ring, where polycyclic aryl is unsubstituted or substituted by 1 or 2 radicals selected from phenyl and polycyclic aryl bearing 2 or 3 phenyl rings, which are linked to each other via a single bond, directly fused to each other and/or fused to a saturated 4- to 10-membered mono- or bicyclic hydrocarbon ring, where the phenyl rings of polycyclic aryl are unsubstituted or carry 1 or 2 radicals Ra.

$R_1$ and $R_2$ may be selected from the group consisting of
phenyl, which is unsubstituted or substituted by 1, 2, 3, 4 or 5 phenyl radicals,
phenyl, which is substituted by 1 or 2 CN radicals,
phenyl, which is substituted by 1 or 2 polycyclic aryl radicals selected from biphenyl, naphthyl, fluorenyl, anthracenyl, phenanthryl and pyrenyl and optionally by 1 further phenyl radical;
naphthyl, which is unsubstituted or substituted by 1 or 2 radicals selected from CN, phenyl and polycyclic aryl selected from biphenyl, naphthyl, fluorenyl, anthracenyl, phenanthryl and pyrenyl;
biphenylenyl;
triphenylenyl;
tetraphenylenyl;
phenanthryl;
pyrenyl;
9H-fluorenyl;
dibenzo[a,e][8]annulenyl;
perylenyl; and
9,9'-spirobi[9H-fluoren]yl.

Here, $R_1$ and $R_2$ may be selected from the group consisting of phenyl, 2-cyanophenyl, 3-cyanophenyl, 4-cyanophenyl, 2-naphthyl, I-naphthyl, and 9-phenanthryl.

$R_1$ and $R_2$ may be selected from the group consisting of
heteroaromatic monocyclic radicals having 5 or 6 ring atoms, which comprise 1, 2, 3 or 4 nitrogen atoms or 1 oxygen atom and 0, 1, 2 or 3 nitrogen atoms or 1 sulfur atom and 0, 1, 2 or 3 nitrogen atoms, where the remainder of the ring atoms are carbon atoms,
heteroaromatic polycyclic radicals, which bear a heteroaromatic monocycle as defined above and 1, 2, 3, 4 or 5 further aromatic rings selected from phenyl and heteroaromatic monocycles, where the (hetero)aromatic rings of polycyclic hetaryl are linked to each other by a covalent bond or fused to each other directly and/or fused to a saturated or unsaturated 4 to 10-membered mono- or bicyclic hydrocarbon ring; and
heteroaromatic polycyclic radicals, which bear at least one saturated or partially unsaturated 5- or 6-membered heterocyclic ring bearing 1 or 2 heteroatoms selected from oxygen, sulfur and nitrogen as ring atoms, and 1, 2, 3, 4 or 5 further aromatic rings selected from phenyl and heteroaromatic monocycles as defined above, where at least one of the further aromatic rings is directly fused to the saturated or partially unsaturated 5- or 6-membered heterocyclic radical and where the remainder of further aromatic rings of polycyclic hetaryl are linked to each other by a covalent bond or fused to each other directly and/or fused to a saturated or unsaturated 4 to 10-membered mono- or bicyclic hydrocarbon ring.

$R_1$ and $R_2$ may be selected from the group consisting of furyl, thienyl, pyrrolyl, imidazolyl, pyrazolyl, 1,2,3-triazolyl, 1,2,4-triazolyl, tetrazolyl, oxazolyl, isoxazolyl, 1,3,4-oxadiazolyl, 1,2,4-oxadiazolyl, pyridyl, pyrazinyl, pyridazinyl, pyrimidinyl, triazinyl, benzofuryl, dibenzofuranyl, benzothienyl, dibenzothienyl, thianthrenyl, naphthofuryl, furo[3,2-b]furanyl, furo[2,3-b]furanyl, furo[3,4-b]furanyl, oxanthrenyl, indolyl, isoindolyl, carbazolyl, indolizinyl, benzopyrazolyl, benzimidazolyl, benzoxazolyl, benzo[cd] indolyl, 1H-benzo[g]indolyl, quinolinyl, isoquinolinyl, acridinyl, phenazinyl, quinazolinyl, quinoxalinyl, phenoxazinyl, benzo[b][1,5]naphthyridinyl, cinnolinyl, 1,5-naphthyridinyl, 1,8-naphthyridinyl, phenylpyrrolyl, naphthylpyrrolyl, dipyridyl, phenylpyridyl, naphthylpyridyl, pyrido[4,3-b]indolyl, pyrido[3,2-b]indolyl, pyrido[3,2-g] quinolinyl, pyrido[2,3-b][1,8]naphthyridinyl, pyrrolo[3,2-b] pyridinyl, pteridinyl, puryl, 9H-xanthenyl, 2H-chromenyl, phenanthridinyl, phenanthrolinyl, furo[3,2-f][1]benzofuranyl, furo[2,3-f][1]benzofuranyl, furo[3,2-g]quinolinyl, furo[2,3-g]quinolinyl, furo[2,3-g]quinoxalinyl, benzo[g] chromenyl, pyrrolo[3,2,1-hi]indolyl, benzo[g]quinoxalinyl, benzo[f]quinoxalinyl, and benzo[h]isoquinolinyl.

In general formula (1) above, X is preferably an allylene group having a carbon number of 2 to 4, a cycloalkylene group having a carbon number of 5 to 8, or an arylene group having a carbon number of 6 to 14; more preferably an alkylene group having a carbon number of 2 or 3, a cycloalkylene group having a carbon number of 5 to 6, or an arylene group having a carbon number of 6 to 10; and especially preferably an alkylene group having a carbon number of 2 or 3, such as an ethylene group.

In general formula (1) above, a and b are each preferably an integer of 1 to 6, more preferably an integer of 1 to 4, and especially preferably an integer of 2 or 3.

The structural unit represented by general formula (1) above preferably includes at least any one of structural units represented by general formulas (A-1) through (A-7) below:

[Chemical formula 16]

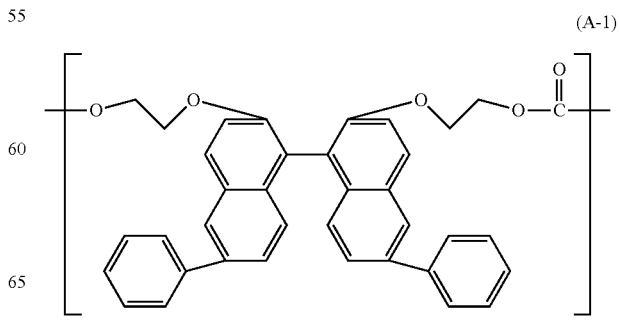

(A-1)

-continued

[Chemical formula 17]

(A-2)

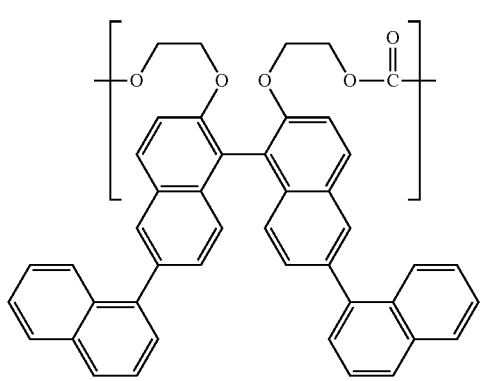

[Chemical formula 18]

(A-3)

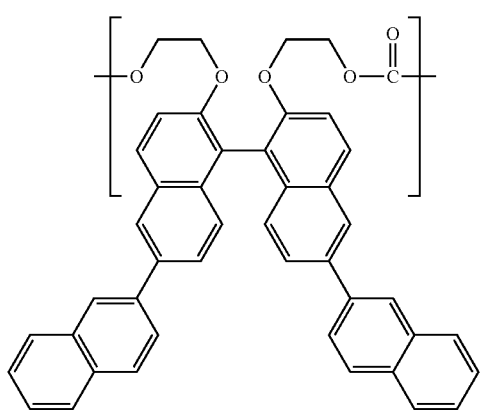

[Chemical formula 19]

(A-4)

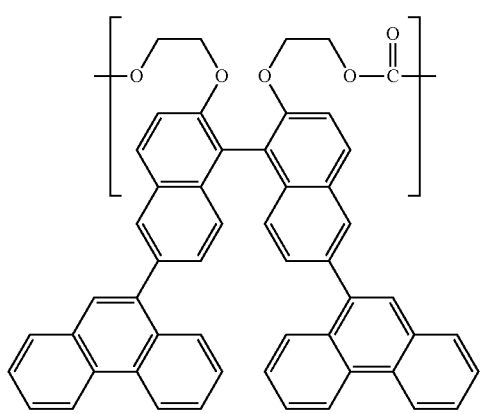

-continued

[Chemical formula 20]

(A-5)

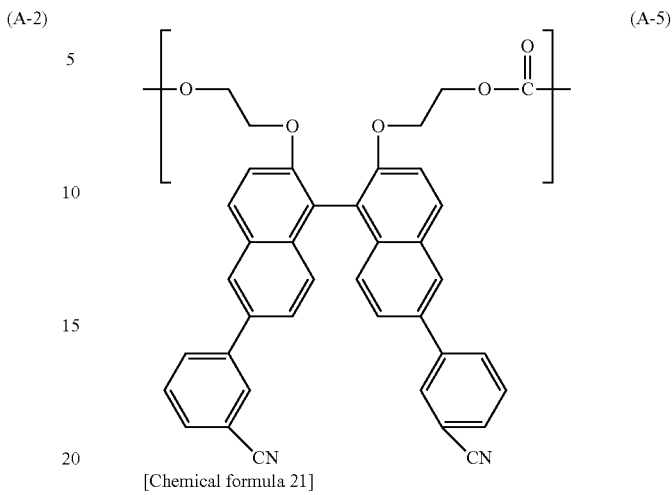

[Chemical formula 21]

(A-6)

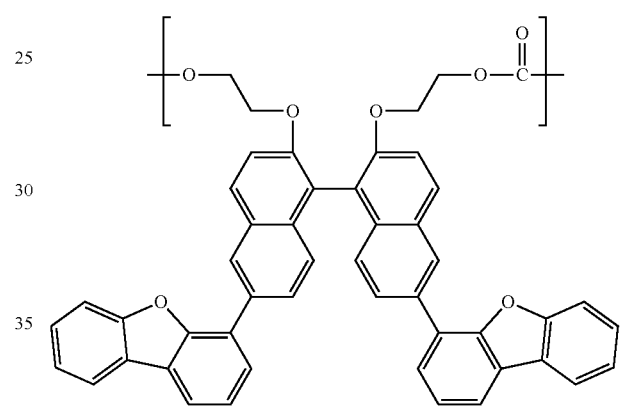

[Chemical formula 22]

(A-7)

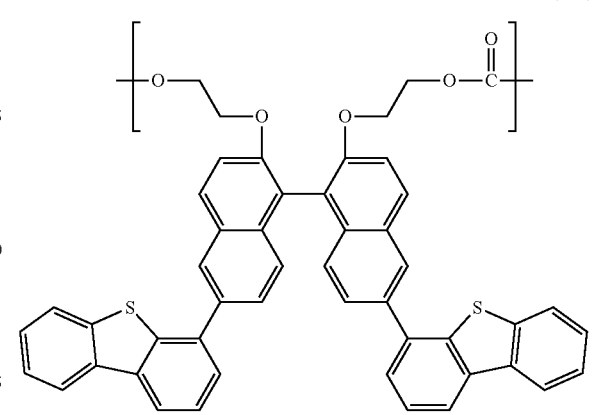

Namely, the structural unit represented by general formula (1) preferably includes at least any one of the structural unit represented by general formula (A-1) which is derived from BINL-2EO (2,2'-bis(2-hydroxyethoxy)-6,6'-diphenyl-1,1'-binaphthalene), the structural unit represented by general formula (A-2) which is derived from DNBINOL-2EO (2,2'-bis(2-hydroxyethoxy)-6,6'-di(naphthalene-1-yl)-1,1'-binaphthalene), the structural unit represented by general formula (A-3) which is derived from 2DNBINOL-2EO (2,2'-bis(2-hydroxyethoxy)-6,6'-di(naphthalene-2-yl)-1,1'- binaphthalene), the structural unit represented by general formula (A-4) which is derived from 9DPNBINOL-2EO (2,2'-bis(2-hydroxyethoxy)-6,6'-di(phenanthrene-9-yl)-1,1'-binaphthalene), the structural unit represented by general formula (A-5) which is derived from CN-BNA (6,6'-di-(3-cyanophenyl)-2,2'-bis-(2-hydroxyethoxy)-1,1'-binaphthalene), the structural unit represented by general formula (A-6) which is derived from FUR-BNA (6,6'-di-(dibenzo[b,d]furan-4-yl)-2,2'-bis-(2-hydroxyethoxy)-1,1'-binaphthalene), and the structural unit represented by general formula (A-7) which is derived from THI-BNA (6,6'-di-(dibenzo[b,d]thien-4-yl)-2,2'-bis-(2-hydroxyethoxy)-1,1'-binaphthalene).

The polycarbonate resin according to the present invention may include the structural unit represented by general formula (1) above preferably at 50 mol % or higher, more preferably at 60 mol % or higher, still more preferably at 70 mol % or higher, and especially preferably 80 or 90 mol % or higher. The polycarbonate resin according to the present invention may be formed only of the structural unit represented by general formula (1).

The polycarbonate resin according to the present invention may include at least one other structural unit in addition to the structural unit represented by general formula (1) (structural unit (1)) above. The other structural unit is preferably a fluorene derivative or the like.

Specifically, the polycarbonate resin according to the present invention preferably further includes at least one of the structural units represented by general formulas (2) and (3).

[Chemical formula 23]

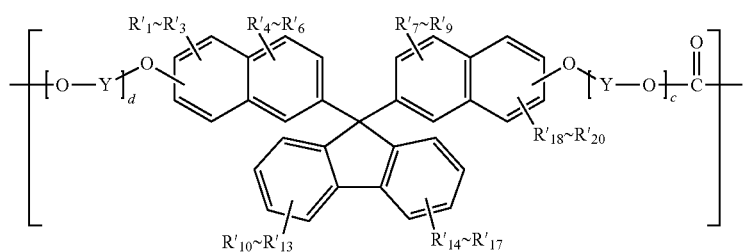

(2)

(in formula (2), $R'_1$ through $R'_{20}$ independently represent a hydrogen atom, a fluorine atom, a chlorine atom, a bromine atom, an iodine atom, an alkyl group having a carbon number of 1 to 6, an aryl group having a carbon number of 6 to 12, an alkenyl group having a carbon number of 2 to 6, an alkoxy group having a carbon number of 1 to 6, or an aralkyl group having a carbon number of 7 to 17;

Y represents an alkylene group having a carbon number of 1 to 8, a cycloalkylene group having a carbon number of 5 to 12, or an arylene group having a carbon number of 6 to 20; and c and d are each an integer of 1 to 10).

In general formula (2) above, $R'_1$ through $R'_{20}$ are independently preferably a hydrogen atom, an alkyl group having a carbon number of 1 to 4, an aryl group having a carbon number of 6 to 12, an alkenyl group having a carbon number of 2 to 4, an alkoxy group having a carbon number of 1 to 4, or an aralkyl group having a carbon number of 7 to 12; and more preferably a hydrogen atom.

In general formula (2) above, Y is preferably an alkylene group having a carbon number of 2 to 4, a cycloalkylene group having a carbon number of 5 to 8, or an arylene group having a carbon number of 6 to 14, more preferably an alkylene group having a carbon number of 2 or 3, a cycloalkylene group having a carbon number of 5 to 6, or an arylene group having a carbon number of 6 to 10; and especially preferably an alkylene group having a carbon number of 2 or 3.

In general formula (2) above, c and d are each preferably an integer of 1 to 6, more preferably an integer of 1 to 4, and especially preferably an integer of 2 or 3.

[Chemical formula 24]

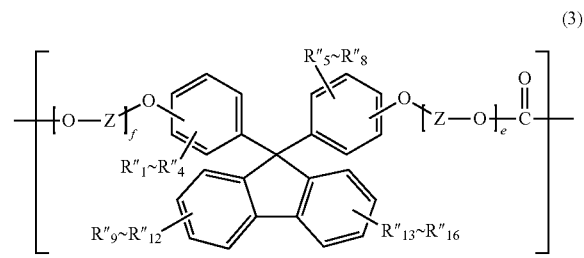

(3)

(in formula (3), $R''_1$ through $R''_6$ independently represent a hydrogen atom, a fluorine atom, a chlorine atom, a bromine atom, an iodine atom, an alkyl group having a carbon number of 1 to 6, an aryl group having a carbon number of 6 to 12, an alkenyl group having a carbon number of 2 to 6, an alkoxy group having a carbon number of 1 to 6, or an aralkyl group having a carbon number of 7 to 17;

Z represents an alkylene group having a carbon number of 1 to 8, a cycloalkylene group having a carbon number of 5 to 12, or an arylene group having a carbon number of 6 to 20; and e and f are each an integer of 1 to 10).

In general formula (3) above, $R''_1$ through $R''_{16}$ are independently preferably a hydrogen atom, an alkyl group having a carbon number of 1 to 4, an aryl group having a carbon number of 6 to 12, an alkenyl group having a carbon number of 2 to 4, an alkoxy group having a carbon number of 1 to 4, or an aralkyl group having a carbon number of 7 to 12; and more preferably a hydrogen atom, or an aryl group having a carbon number of 6 to 10.

In general formula (3) above, Z is preferably an alkylene group having a carbon number of 2 to 4, a cycloalkylene group having a carbon number of 5 to 8, or an arylene group having a carbon number of 6 to 14; more preferably an alkylene group having a carbon number of 2 or 3, a cycloalkylene group having a carbon number of 5 to 6, or an arylene group having a carbon number of 6 to 10; and especially preferably an alkylene group having a carbon number of 2 or 3.

In general formula (3) above, e and f are each preferably an integer of 1 to 6, more preferably an integer of 1 to 4, and especially preferably an integer of 2 or 3.

It is preferred that the polycarbonate resin according to the present invention includes structural unit (1), and at least one of the structural units represented by general formula (4) below as the structural unit represented by general formula (2) or (3).

[Chemical formula 25]

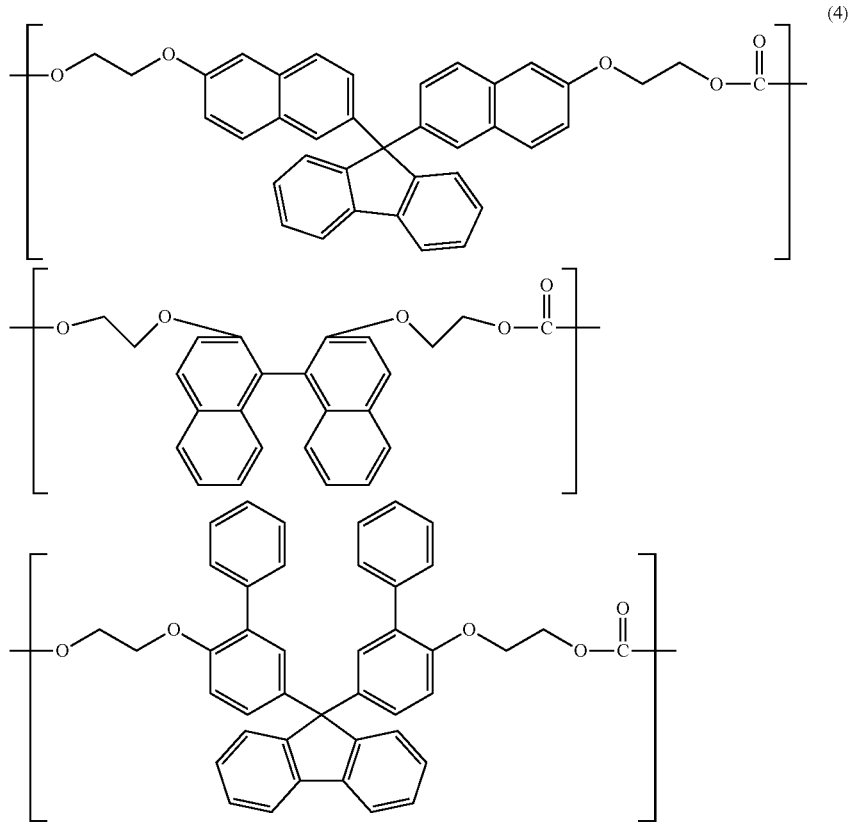

(4)

Namely, it is preferred that the polycarbonate resin according to the present invention includes structural unit (1), and also at least one of a structural unit derived from BNEF (9,9-bis(6-(2-hydroxyethoxy)naphthalene-2-yl)fluorene), a structural unit derived from BNE (2,2'-bis(2-hydroxyethoxy)-1,1'-binaphthalene), and a structural unit derived from BPPEF (9,9-bis(4-(2-hydroxyethoxy)-3-phenylphenyl)fluorene) represented by general formula (4) above.

The polycarbonate resin according to the present invention may include a structural unit other than structural unit (1), preferably the structural unit represented by general formula (2) or (3) above at 20 to 80 mol % in total, for example, at 25 to 75 mol % in total. The polycarbonate resin includes the structural unit represented by general formula (2) or (3) above, at, for example, 30 to 70 mol %, 35 to 65 mol %, or 40 to 60 mol %.

Namely, the molar ratio between structural unit (1) and structural unit (2) represented by general formula (2) in a polycarbonate resin composition according to the present invention is, for example, 4:1 to 1:4 or 7:3 to 3:7. The molar ratio may be 65:35 to 35:65, 3:2 to 2:3, or 1:1. It is preferred that structural unit (1) is included at 50 mol % or higher in the polycarbonate resin composition as described above. Therefore, preferable specific examples of the molar ratio between structural unit (1) and structural unit (2) are 4:1 to 1:1, 7:3 to 1:1, 65:35 to 1:1, 3:2 to 1:1, and the like.

The molar ratio between structural unit (1) and structural unit (3) represented by general formula (3) is substantially the same as the molar ratio between structural unit (1) and structural unit (2) described above.

The polycarbonate resin according to the present invention may include either one of a random copolymer structure, a block copolymer structure, and an alternating copolymer structure. The polycarbonate resin according to the present invention does not need to include all of structural unit (1), structural unit (2) and structural unit (3) in one, same polymer molecule. Namely, the polycarbonate resin according to the present invention may be a blend resin as long as the above-described structures are each included in any of a plurality of polymer molecules. For example, the polycarbonate resin including all of structural unit (1), structural unit (2) and structural unit (3) described above may be a copolymer including all of structural unit (1), structural unit (2) and structural unit (3), may be a mixture of a homopolymer or a copolymer including structural unit (1), a homopolymer or a copolymer including structural unit (2) and a homopolymer or a copolymer including structural unit (3); may be a blend resin of a copolymer including structural unit (1) and structural unit (2) and a copolymer including structural unit (1) and structural unit (3); etc.

The polycarbonate resin according to the present invention may be blended with another resin to produce a molded body. Examples of such another resin include polyamide, polyacetal, polycarbonate, denatured polyphenyleneether, polyethyleneterephthalate, polybutyleneterephthalate, and the like.

It is preferred that the polycarbonate resin composition according to the present invention includes an antioxidant, a releasing agent, a processing stabilizer, an ultraviolet absorber, a fluidity modifier, a nucleating agent, a reinforcing agent, a dye, an antistatic agent, an antibacterial agent, or the like.

Examples of the antioxidant include triethyleneglycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxyhydrocinnamide, 3,5-di-tert-butyl-4-hydroxybenzylphosphonate-diethylester, tris(3,5-di-tert-butyl-4-hydroxybenzyl)isocyanurate, and 3,9-bis{1,1-dimethyl-2-[3-(3-tert-butyl-4-hydroxy-5-methylphenyl)propionyloxy]ethyl}-2,4,8,10-tetraoxaspiro(5,5)undecane, and the like. Among these, pentaerythritol-tetrakis[3-(3,5-di-tert-butyl-4-hydroxyphenyl)propionate] is preferable. The content of the antioxidant in the polycarbonate resin composition is preferably 0.001 to 0.3 parts by weight with respect to 100 parts by weight of the polycarbonate resin.

A preferable releasing agent contains at least 90% by weight of an ester of an alcohol and a fatty acid. Specific examples of the ester of an alcohol and a fatty acid include an ester of a monovalent alcohol and a fatty acid, and a partial ester or a total ester of a polyvalent alcohol and a fatty acid. A preferable example of the above-described ester of an alcohol and a fatty acid is an ester of a monovalent alcohol having a carbon number of 1 to 20 and a saturated fatty acid having a carbon number of 10 to 30. A preferable example of the partial or total ester of a polyvalent alcohol and a fatty acid is a partial or total ester of a polyvalent alcohol having a carbon number of 1 to 25 and a saturated fatty acid having a carbon number of 10 to 30.

Specific examples of the ester of a monovalent alcohol and a saturated fatty acid include atearyl stearate, palmityl palmitate, butyl stearate, methyl laurate, isopropyl palmitate, and the like. Specific examples of the partial or total ester of a polyvalent alcohol and a saturated fatty acid include monoglyceride stearate, diglyceride stearate, triglyceride stearate, monosorbitate stearate, monoglyceride behenate, monoglyceride caprate, monoglyceride laurate, pentaerythritol monostearate, pentaerythritol tetrastearate, pentaerythritol tetrapelargonate, propyleneglycol monostearate, biphenyl biphenate, sorbitan monostearate, 2-ethylhexylstearate, total or partial esters of dipentaerythritol such as dipentaerythritol hexastearate and the like, etc. Among these, monoglyceride stearate and monoglyceride laurate are especially preferable. The content of the releasing agent is preferably 0.005 to 2.0 parts by weight, more preferably 0.01 to 0.6 parts by weight, and still more preferably 0.02 to 0.5 parts by weight, with respect to 100 parts by weight of the polycarbonate resin.

Examples of the processing stabilizer include a phosphorus-based processing stabilizer, a sulfur-based processing stabilizer, and the like. Examples of the phosphorus-based processing stabilizer include phosphorous acid, phosphoric acid, phosphonous acid, phosphonic acid, esters thereof, and the like. Specific examples thereof include triphenylphosphite, tris(nonylphenyl)phosphite, tris(2,4-di-tert-butylphenyl)phosphite, tris(2,6-di-tert-butylphenyl)phosphite, tridecylphosphite, trioctylphosphite, trioctadecylphosphite, didecylmonophenylphosphite, dioctylmonophenylphosphite, diisopropylmonophenylphosphite, monobutyldiphenylphosphite, monodecyldiphenylphosphite, monooctyldiphenylphosphite, bis(2,6-di-tert-butyl-4-methylphenyl)pentaerythritoldiphosphite, 2,2-methylenebis(4,6-di-tert-butylphenyl)octylphosphite, bis(nonylphenyl)pentaerythritoldiphosphite, bis(2,4-dicumylphenyl)pentaerythritoldiphosphite, bis(2,4-di-tert-butylphenyl)pentaerythritoldiphosphite, distearylpentaerythritoldiphosphite, tributylphosphate, triethylphosphate, trimethylphosphate, triphenylphosphate, diphenylmonoorthoxenylphosphate, dibutylphosphate, dioctylphosphate, diisopropylphosphate, dimethyl benzenephosphonate, diethyl benzenephosphonate, dipropyl benzenephosphonate, tetrakis(2,4-di-t-butylphenyl)-4,4'-biphenylenediphosphonite, tetrakis(2,4-di-t-butylphenyl)-4,3'-biphenylenediphosphonite, tetrakis(2,4-di-t-butylphenyl)-3,3'-biphenylenediphosphonite, bis(2,4-di-tert-butylphenyl)-4-phenyl-phenylphosphonite, bis(2,4-di-tert-butylphenyl)-3-phenyl-phenylphosphonite, and the like. Among these, bis(2,6-di-tert-butyl-4-methylphenyl)pentaerythritoldiphosphite is preferable. The content of the phosphorus-based processing stabilizer in the polycarbonate resin composition is preferably 0.001 to 0.2 parts by weight with respect to 100 parts by weight of the polycarbonate resin.

Examples of the sulfur-based processing stabilizer include pentaerythritol-tetrakis(3-laurylthiopropionate), pentaerythritol-tetrakis(3-myristylthiopropionate), pentaerythritol-tetrakis(3-stearylthiopropionate), dilauryl-3,3'-thiodipropionate, dimyristl-3,3'-thiodipropionate, distearyl-3,3'-thiodipropionate, and the like. The content of the sulfur-based processing stabilizer in the polycarbonate resin composition is preferably 0.001 to 0.2 parts by weight with respect to 100 parts by weight of the polycarbonate resin.

A preferable example of the ultraviolet absorber is at least one selected from the group consisting of a benzotriazole-based ultraviolet absorber, a benzophenone-based ultraviolet absorber, a triazine-based ultraviolet absorber, a cyclic iminoester-based ultraviolet absorber, and a cyanoacrylate-based ultraviolet absorber. Namely, the following ultraviolet absorbers may be used independently or in a combination of two or more.

Examples of the benzotriazole-based ultraviolet absorber include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazole-2-yl)phenol)], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazine-4-one), 2-[2-hydroxy-3-(3,4,5,6-tetrahydrophthalimidemethyl)-5-methylphenyl]benzotriazole, and the like.

Examples of the benzophenone-based ultraviolet absorber include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxybenzophenone-5-sulfonic acid hydrate, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone, 2-hydroxy-4-methoxy-2'-carboxybenzophenone, and the like.

Examples of the triazine-based ultraviolet absorber include 2-(4,6-diphenyl-1,3,5-triazine-2-yl)-5-([(hexyl)oxy]-phenol, 2-(4,6-bis(2,4-dimethylphenyl)-1,3,5-triazine-2-yl)-5-([(octyl)oxy]-phenol, and the like.

Examples of the cyclic iminoester-based ultraviolet absorber include 2,2'-bis(3,1-benzoxazine-4-one), 2,2'-p-phenylenebis(3,1-benzoxazine-4-one), 2,2'-m-phenylenebis(3,1-benzoxazine-4-one), 2,2'-(4,4'-diphenylene)bis(3,1-benzoxazine-4-one), 2,2'-(2,6-naphthalene)bis(3,1-benzoxazine-4-one), 2,2'-(1,5-naphthalene)bis(3,1-benzoxazine-4-one), 2,2'-(2-methyl-p-phenylene)bis(3,1-benzoxazine-4-one), 2,2'-(2-nitro-p-phenylene)bis(3,1-benzoxazine-4-one), 2,2'-(2-chloro-p-phenylene)bis(3,1-benzoxazine-4-one), and the like.

Examples of the cyanoacrylate-based ultraviolet absorber include 1,3-bis-[(2'-cyano-3',3'-diphenylacryloyl)oxy]-2,2-bis[(2-cyano-3,3-diphenylacryloyl)oxy]methyl)propane, 1,3-bis-[(2-cyano-3,3-diphenylacryloyl)oxy]benzene, and the like.

The content of the ultraviolet absorber is preferably 0.01 to 3.0 parts by weight, more preferably 0.02 to 1.0 parts by weight, and still preferably 0.05 to 0.8 parts by weight, with respect to 100 parts by weight of the polycarbonate resin. The ultraviolet absorber contained in such a range of content in accordance with the use may provide a sufficient weather resistance to the polycarbonate resin composition.

The polycarbonate resin composition contains, as impurities, phenol generated during the production thereof or carbonate diester remaining without being reacted. The content of the phenol in the polycarbonate resin composition is preferably 0.1 to 3000 ppm, more preferably 0.1 to 2000 ppm, and still more preferably 0.1 to 1000 ppm, 0.1 to 800 ppm, 0.1 to 500 ppm or 0.1 to 300 ppm. The content of the carbonate diester in the polycarbonate resin composition is preferably 0.1 to 1000 ppm, more preferably 0.1 to 500 ppm, and especially preferably 0.1 to 100 ppm. The contents of the phenol and the carbonate diester in the polycarbonate resin composition may be adjusted to obtain a resin having properties suitable to the use thereof. The contents of the phenol and the carbonate diester may be appropriately adjusted by changing the conditions or the device of polycondensation. Alternatively, the contents of the phenol and the carbonate diester may be adjusted by changing the conditions in an extrusion step after the polycondensation.

In the case where the content of the phenol or the carbonate diester is higher than the above-described range, a problem may occur that the strength of the resultant resin molded body is decreased or that an odor is generated, for example. By contrast, in the case where the content of the phenol or the carbonate diester is lower than the above-described range, the plasticity of the resin when the resin is melted may be undesirably decreased.

(2) Properties of the Polycarbonate Resin

The viscosity-average molecular weight (Mv) of the polycarbonate resin according to the present invention is preferably 8.000 to 20,000, more preferably 9,000 to 15,000, and still more preferably 10,000 to 14,000.

In the case where the value of Mv is smaller than 8,000, the molded body may be undesirably brittle. In the case where the value of Mv is larger than 20,000, the melt viscosity is too high. Therefore, it becomes difficult to remove the resin after the production thereof, and also the fluidity is decreased and it may be made difficult to perform injection molding in a melted state.

The refractive index (nD) of the polycarbonate resin according to the present invention at 23° C. at a wavelength of 589 nm is preferably 1.635 or higher, more preferably 1.645 or higher, still more preferably 1.655 or higher, and especially preferably 1.665 or higher, or higher than those values. For example, the refractive index of the polycarbonate resin according to the present invention is preferably 1.640 to 1.710, more preferably 1.645 to 1.700, still more preferably 1.650 to 1.697, and especially preferably 1.655 to 1.695. The polycarbonate resin according to the present invention has a high refractive index (nD) and thus is suitable to an optical lens. The refractive index of a film having a thickness of 0.1 mm may be measured by use of an Abbe refractive index meter by a method of JIS-K-7142.

The Abbe number (v) of the polycarbonate resin according to the present invention is preferably 24 or lower, more preferably 22 or lower, and still more preferably 20 or lower. The Abbe number may be calculated by use of the following equation based on the refractive index at wavelengths of 487 nm, 589 nm and 656 nm at 23° C.

$$v=(nD-1)(nF-nC)$$

nD: refractive index at a wavelength of 589 nm
nC: refractive index at a wavelength of 656 nm
nF: refractive index at a wavelength of 486 nm The glass transition temperature (Tg) of the polycarbonate resin according to the present invention is, in consideration of that the polycarbonate is usable for injection molding, preferably 90 to 185° C. more preferably 95 to 180° C., and still more preferably 100 to 175° C. In the case where Tg is lower than 90° C., the range of usable temperature may be undesirably small. In the case where Tg is higher than 185° C., the melting temperature of the resin may be too high, and thus the resin may be undesirably decomposed or colored easily. In the case where the glass transition temperature of the resin is too high, the difference between the temperature of the mold and the glass transition temperature of the resin is made too large with a general-purpose mold temperature adjustor. Therefore, for a use in which a product is required to have a high surface accuracy, it may be difficult to use a resin having too high a glass transition temperature. From the point of view of the molding fluidity and the molding heat resistance, the lower limit of Tg is preferably 130° C. and more preferably 135° C., and the upper limit of Tg is preferably 185° C. and more preferably 175° C.

An optical molded body produced by use of the polycarbonate resin according to the present invention has a total light transmittance of preferably 85% or higher, more preferably 87% or higher, and especially preferably 88% or higher. A total light transmittance of preferably 85% or higher is as good as that of bisphenol A type polycarbonate resin or the like.

The polycarbonate resin according to the present invention has a high moisture and heat resistance. The moisture and heat resistance may be evaluated by performing a "PCT test" (pressure cooker test) on an optical molded body produced by use of the polycarbonate resin and then measuring the total light transmittance of the optical molded body after the PCT test. For the PCT test, an injection molded body having a diameter of 50 mm and a thickness of 3 mm is kept under the conditions of 120° C., 0.2 MPa, 100% RH and 20 hours. The polycarbonate resin according to the present invention has a post-PCT test total light transmittance of 60% or higher, preferably 70% or higher, more preferably 75% or higher, still more preferably 80% or higher, and especially preferably 85% or higher. As long as the total light transmittance is 60% or higher, the polycarbonate resin is considered to have a higher moisture and heat resistance than that of the conventional polycarbonate resin.

The polycarbonate resin according to the present invention has a b value, which represents the hue, of preferably 5 or lower. As the b value is smaller, the color is less yellowish, which is good as a hue.

(3) Method for Producing the Polycarbonate Resin

A method for producing the polycarbonate resin, according to the present invention, including the structural unit represented by general formula (1) above includes a step of performing melt polycondensation of a dihydroxy compound represented by general formula (5) below and a carbonate diester.

[Chemical formula 26]

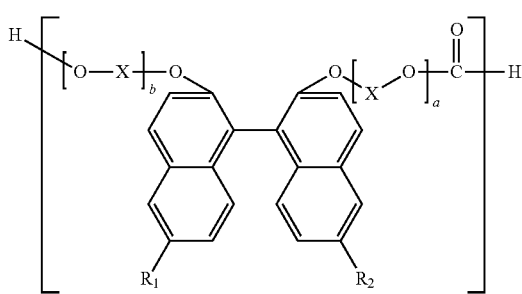

(5)

(in formula (5), $R_1$ and $R_2$ independently represent a hydrogen atom, a fluorine atom, a chlorine atom, a bromine atom, an iodine atom, an alkyl group having a carbon number of 1 to 6, a mono- or polycyclic hetaryl aryl group having a carbon number of 6 to 36, a mono- or polycyclic hetaryl having a total of 5 to 36 atoms, which are ring members, where 1, 2, 3 or 4 of these atoms are selected from nitrogen, sulfur and oxygen, while the remainder of these atoms are carbon atoms, an alkenyl group having a carbon number of 2 to 6, an alkoxy group having a carbon number of 1 to 6, or an aralkyl group having a carbon number of 7 to 17, where $R_1$ and $R_2$ are not all a hydrogen atom;

X represents an alkylene group having a carbon number of 1 to 8, a cycloalkylene group having a carbon number of 5 to 12 or an arylene group having a carbon number of 6 to 20;

where alkylene group and cycloalkylene group are unsubstituted or carry a phenyl ring, and a and b are each an integer of 1 to 10).

Namely, the compound represented by general formula (5) above may be used as a dihydroxy component and reacted with a carbonate precursor substance such as carbon diester or the like to produce a polycarbonate resin. Specifically, the compound represented by general formula (5) and a carbonate precursor substance such as carbon diester or the like may be reacted with each other by a melt polycondensation method in the presence of a basic compound catalyst, a transesterification catalyst or a mixed catalyst formed of both thereof, or in the absence of any catalyst.

The dihydroxy compound represented by general formula (5) above may be used as a material (monomer) to obtain a polymer other than the polycarbonate resin, for example, polyester carbonate and polyester.

Example of the compounds represented by general formula (5) include 2,2'-bis(hydroxy(poly)alkoxy)-diaryl-1,1,1'-binaphthalenes, and 2,2'-bis(hydroxy(poly)alkoxy)-dinaphtyl-1,1'-binaphthalenes. Preferable examples thereof include 2,2'-bis(2-hydroxyethoxy)-6,6'-diphenyl-1,1'-binaphthalene, 2,2'-bis(2-hydroxyethoxy)-6,6'-di(naphthalene-1-yl)-1,1'-binaphthalene, 2,2'-bis(2-hydroxymethoxy)-6,6'-diphenyl-1,1'-binaphthalene, 2,2'-bis(2-hydroxymethoxy)-6,6'-di(naphthalene-1-yl)-1,1'-binaphthalene, 2,2'-bis(2-hydroxypropoxy)-6,6'-diphenyl-1,1'-binaphthalene, and 2,2'-bis(2-hydroxypropoxy)-6,6'-di(naphthalene-1-yl)-1,1'-binaphthalene. These may be used independently or in a combination of two or more.

The monomer usable to produce the polycarbonate resin may contain, as impurities, a dihydroxy compound in which both of the a value and the b value in general formula (5) above are 0 or a dihydroxy compound in which either the a value or the b value in general formula (5) above is 0, in addition to the dihydroxy compound represented by general formula (5) above.

Such a dihydroxy compound in which at least one of the a value and the b value is different from that of general formula (5) above is contained in a total amount of preferably 1000 ppm or lower, more preferably 500 ppm or lower, still more preferably 200 ppm or lower, and especially preferably 100 ppm or lower, in a monomer containing, as a main component, the hydroxy compound represented by general formula (5) above. The total content, in the monomer, of the dihydroxy compound in which at least one of the a value and the b value is different from that of general formula (5) above is preferably 50 ppm or lower, and more preferably 20 ppm or lower.

The compound represented by general formula (5) may be produced by any of various synthesis methods. Examples of the usable method include, as described in Japanese Laid-Open Patent Publications Nos. 2014-227387, 2014-227388, 2015-168658, and 2015-187098, (a) a method of reacting 1,1'-binaphthol and ethyleneglycolmonotosylate, (b) a method of reacting a binaphthol and alkyleneoxide, halogenoalkanol or alkylenecarbonate, (c) a method of reacting ethylenecarbonate with 1,1'-binaphthol, (d) a method of reacting 1,1'-binaphthol and ethylenecarbonate, or the like.

The polycarbonate resin, according to the present invention, including the structural unit represented by general formula (1) may use, as a dihydroxy component, an aromatic dihydroxy compound or an aliphatic dihydroxy compound (e.g., a dihydroxy compound or a binaphthol having a fluorene backbone), in addition to the compound represented by general formula (5).

Preferably, the polycarbonate resin according to the present invention may be produced by use of, as a dihydroxy component, a compound represented by general formula (6) below and/or a compound represented by general formula (7) below, in addition to the compound represented by general formula (5) above.

[Chemical formula 27]

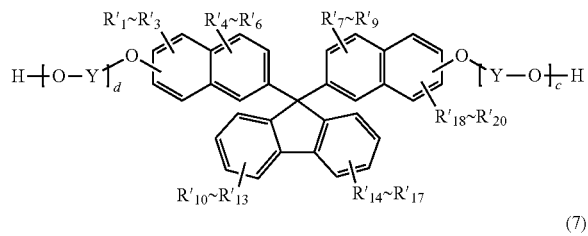

(6)

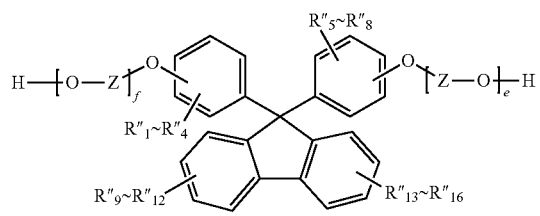

(7)

In formula (6). $R'_1$ through $R'_{20}$ independently represent a hydrogen atom, a fluorine atom, a chlorine atom, a bromine atom, an iodine atom, an alkyl group having a carbon number of 1 to 6, an aryl group having a carbon number of 6 to 12, an alkenyl group having a carbon number of 2 to 6, an alkoxy group having a carbon number of 1 to 6, or an aralkyl group having a carbon number of 7 to 17;

Y represents an alkylene group having a carbon number of 1 to 8, a cycloalkylene group having a carbon number of 5 to 12 or an arylene group having a carbon number of 6 to 20; and c and d are each an integer of 1 to 10.

In formula (7), $R''_1$ through $R''_{16}$ independently represent a hydrogen atom, a fluorine atom, a chlorine atom, a bromine atom, an iodine atom, an alkyl group having a carbon number of 1 to 6, an aryl group having a carbon number of 6 to 12, an alkenyl group having a carbon number of 2 to 6, an alkoxy group having a carbon number of 1 to 6, or an aralkyl group having a carbon number of 7 to 17:

Z represents an alkylene group having a carbon number of 2 to 8, a cycloalkylene group having a carbon number of 5 to 12 or an arylene group having a carbon number of 6 to 20; and e and f are each an integer of 1 to 10.

Examples of the dihydroxy compound represented by formula (6) include 2,2'-bis(1-hydroxymethoxy)-1,1'-binaphtyl, 2,2'-bis(2-hydroxyethoxy)-1,1'-binaphtyl, 2,2'-bis(3-hydroxypropyloxy)-1,1'-binaphtyl, 2,2'-bis(4-hydroxybutoxy)-1,1'-binaphtyl, and the like. Among these, 2,2'-bis(2-hydroxyethoxy)-1,1'-binaphtyl is preferable. These may used independently or in a combination of two or more.

Examples of the dihydroxy compound represented by formula (7) include 9,9-bis[4-(2-hydroxyethoxy)phenyl]fluorene, 9,9-bis[4-(2-hydroxyethoxy)-3-methylphenyl]fluorene, 9,9-bis[4-(2-hydroxyethoxy)-3-tert-butylphenyl]fluorene, 9,9-bis[4-(2-hydroxyethoxy)-3-isopropylphenyl]fluorene, 9,9-bis[4-(2-hydroxyethoxy)-3-cyclohexylphenyl]fluorene, 9,9-bis[4-(2-hydroxyethoxy)-3-phenylphenyl]fluorene, and the like. Among these, 9,9-bis[4-(2-hydroxyethoxy)phenyl]fluorene and 9,9-bis[4-(2-hydroxyethoxy)-3-phenylphenyl]fluorene are preferable. These may used independently or in a combination of two or more.

Examples of the dihydroxy compound represented by formula (6) or (7) include a compound represented by general formula (8) below.

[Chemical formula 28]

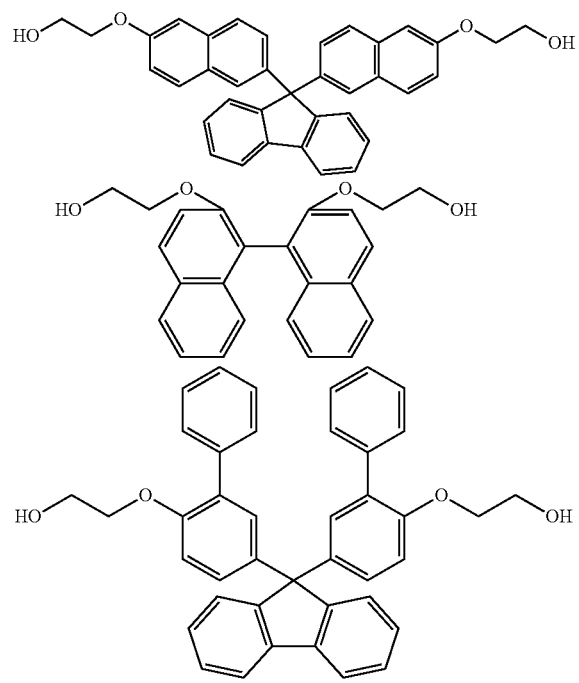

(8)

The monomer usable to produce the polycarbonate resin may contain, as impurities, a dihydroxy compound in which both of the c value and the d value in general formula (6) are 0 above or a dihydroxy compound in which either the c value or the d value in general formula (6) above is 0, in addition to the dihydroxy compound represented by general formula (6) above.

Such a dihydroxy compound in which at least one of the c value and the d value is different from that of general formula (6) above is contained in a total amount of preferably 1000 ppm or lower, more preferably 500 ppm or lower, still more preferably 200 ppm or lower, and especially preferably 100 ppm or lower, in a monomer containing, as a main component, the hydroxy compound represented by general formula (6) above. The total content, in the monomer, of the dihydroxy compound in which at least one of the c value and the d value is different from that of general formula (6) above is preferably 50 ppm or lower, and more preferably 20 ppm or lower.

The content of the impurities in the dihydroxy compound represented by general formula (7) is substantially the same as that in the dihydroxy compound represented by general formula (6). More specifically, the monomer usable to produce the polycarbonate resin may contain, as impurities, a dihydroxy compound in which both of the e value and the f value in general formula (7) above are 0 or a dihydroxy compound in which either the e value or the f value in general formula (7) above is 0, in addition to the dihydroxy compound represented by general formula (7) above.

Such impurities are contained in a total amount of preferably 1000 ppm or lower, more preferably 500 ppm or lower, still more preferably 200 ppm or lower, and especially preferably 100 ppm or lower, in a monomer containing, as a main component, the hydroxy compound represented by general formula (7) above. The total content of the impurities in the monomer is preferably 50 ppm or lower, and more preferably 20 ppm or lower.

The compound represented by general formula (6) or (7) may be produced by any of various synthesis methods. Examples of the usable method include, as described in Japanese Patent No. 5442800 and Japanese Laid-Open Patent Publications No. 2014-028806, (a) a method of reacting a fluorenone and a hydroxynaphthalene in the presence of hydrogen chloride gas and mercaptocarboxylic acid, (b) a method of reacting 9-fluorenone and a hydroxynaphthalene in the presence of an acidic catalyst (and aklylmercaptan), (c) a method of reacting a fluorenone and a hydroxynaphthalene in the presence of hydrochloric acid and a thiol (mercaptocarboxylic acid or the like), or (d) a method of reacting a fluorenone and a hydroxynaphthalene in the presence of sulfuric acid and a thiol (mercaptocarboxylic acid or the like). After such a reaction, a method of crystallizing the reaction product by a crystallization solvent formed of a hydrocarbon and a polar solvent to produce bisnaphtholfluorene is used to provide 9,9-bis(hydroxynaphtyl)fluorene. This is reacted with a compound corresponding to an [XO]a group or an [XO]b group (alkyleneoxide, haloalkanol or the like). In this manner, the compound represented by general formula (6) or (7) may be produced. For example, 9,9-bis[6-(2-hydroxyethoxy)naphtyl]fluorene may be obtained by reacting 9,9-bis[6-(hydroxynaphtyl] fluorene and 2-chloroethanol under alkaline conditions.

Examples of the aromatic dihydroxy compound usable in addition to the above include bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC, bisphenol Z and the like.

(Amount of Vinyl Terminal Group)

The polycarbonate resin according to the present invention is obtained by use of compounds represented by, for example, general formulas (5) through (8) above as dihydroxy components, by reacting each of such compounds with a carbonate precursor substance such as carbonate diester or the like. In a polymerization step to produce the polycarbonate resin, impurities may be generated as a result of one or both of —OROH groups at the terminals of each of the compounds of general formulas (5) through (8) above being converted into a vinyl terminal group represented as, for example, an —OC=CH group.

However, the amount of the impurities having such a vinyl terminal structure is usually a trace amount, and the produced polymer is usable as a polycarbonate resin without being refined.

Examples of the carbonate diester usable for the present invention include diphenylcarbonate, ditolylcarbonate, bis(chlorophenyl)carbonate, m-cresylcarbonate, dimethylcarbonate, diethylcarbonate, dibutylcarbonate, dicyclohexylcarbonate, and the like. Among these, diphenylcarbonate is especially preferable. Diphenylcarbonate is used at a ratio of preferably 0.97 to 1.20 mol, and more preferably 0.98 to 1.10 mol, with respect to 1 mol of the dihydroxy compound(s) in total.

Examples of the basic compound catalyst, among the above-described transesterification catalysts usable to produce the polycarbonate resin, specifically include an alkaline metal compound, an alkaline earth metal compound, a nitrogen-containing compound, and the like.

Examples of the alkaline metal compound usable for the present invention include an organic acid salt, an inorganic salt, an oxide, a hydroxide, a hydride, an alkoxide, and the like of an alkaline metal. Specific examples thereof include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium borophenoxide, sodium benzoate, potassium benzoate, cesium benzoate, lithium benzoate, disodium hydrogen phosphate, dipotassium hydrogen phosphate, dilithium hydrogen phosphate, and disodium phenylphosphate; and also include disodium salt, dipotassium salt, dicesium salt, dilithium salt of bisphenol A; sodium salt, potassium salt, cesium salt and lithium salt of phenol; and the like.

Examples of the alkaline earth metal compound include an organic acid salt, an inorganic salt, an oxide, a hydroxide, a hydride, an alkoxide, and the like of an alkaline earth metal compound. Specific examples thereof include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenylphosphate, and the like.

Examples of the nitrogen-containing compound include quaternary ammoniumhydroxide, salt thereof, amines, and the like. Specific examples thereof include quaternary ammoniumhydroxides including an alkyl group, an aryl group or the like such as tetramethylammoniumhydroxide, tetraethylammoniumhydroxide, tetrapropylammoniumhydroxide, tetrabutylammoniumhydroxide, trimethylbenzylammoniumhydroxide, and the like; tertiary amines such as triphenylamine dimethylbenzylamine, triphenylamine, and the like; secondary amines such as diethylamine, dibutylamine, and the like; primary amines such as propylamine, butylamine, and the like; imidazoles such as 2-methylimidazole, 2-phenylimidazole, benzoimidazole, and the like; bases or basic salts such as ammonia, tetramethylammoniumborohydride, tetrabutylammoniumborohydride, tetrabutylammoniumtetraphenylborate, tetraphenylammoniumtetraphenylborate, and the like; etc.

Preferable examples of the transesterification catalyst include salts such as zinc, tin, zirconium, lead, and the like. There may be used independently or in a combination of two or more.

Specific examples of the transesterification catalyst include zinc acetate, zinc benzoate, zinc 2-ethylhexanate, tin chloride (II), tin chloride (IV), tin acetate (II), tin acetate (IV), dibutyltinlaurate, dibutyltinoxide, dibutyltinmethoxide, zirconiumacetylacetonate, zirconium oxyacetate, zirconiumtetrabutoxide, lead acetate (II), lead acetate (IV), and the like.

These catalysts are used at a ratio of $10^{-9}$ to $10^{-3}$ mol, preferably $10^{-7}$ to $10^{-4}$ mol, with respect to 1 mol of the dihydroxy compound(s) in total.

According to the melt polycondensation method, melt polycondensation is performed while a byproduct is being removed by a transesterification reaction under heating at room pressure or reduced pressure by use of the above-described materials and catalysts.

The melt polycondensation reaction in a composition system according to the present invention is preferably performed after the compound represented by general formula (5) and carbonate diester are melted in a reactor, in a state where the monohydroxy compound generated as a byproduct is kept residing. In order to allow the monohydroxy compound to reside, the pressure may be controlled by closing the reactor, or by increasing or decreasing the pressure. The reaction time for this step is 20 minutes or longer and 240 minutes or shorter, preferably 40 minutes or longer and 180 minutes or shorter, and especially preferably 60 minutes or longer and 150 minutes or shorter. In this step, in the case where the monohydroxy compound generated as a byproduct is removed by distillation soon after being generated, the finally obtained polycarbonate resin has a low content of high molecular-weight form. By contrast, in the case where the monohydroxy compound generated as a byproduct is allowed to reside in the reactor for a certain time, the finally obtained polycarbonate resin has a high content of high molecular-weight form.

The melt polycondensation reaction may be performed in a continuous system or in a batch system. The reactor usable for the reaction may be of a vertical type including an anchor-type stirring blade, a Maxblend® stirring blade, a helical ribbon-type stirring blade or the like; of a horizontal type including a paddle blade, a lattice blade, an eye glass-type blade or the like; or an extruder type including a screw. A reactor including a combination of such reactors is preferably usable in consideration of the viscosity of the polymerization product.

According to the method for producing the polycarbonate resin according to the present invention, after the polymerization reaction is finished, the catalyst may be removed or deactivated in order to maintain the thermal stability and the hydrolysis stability. A method of adding a known acidic substance to deactivate a catalyst is preferably usable. Specific examples of the acidic substance include esters such as butyl benzoate and the like; aromatic sulfonates such as p-toluenesulfonic acid and the like; aromatic sulfonic acid esters such as butyl p-toluenesulfonate, hexyl p-toluenesulfonate, and the like; phosphoric acids such as phosphorous acid, phosphoric acid, phophonic acid, and the like; phosphorous acid esters such as trtiphenyl phosphite, monophenyl phosphite, diphenyl phosphite, diethyl phosphite, di-n-propyl phosphite, di-n-butyl phosphite, di-n-hexyl phosphite, dioctyl phosphite, monooctyl phosphite, and the like; phosphoric acid esters such as triphenyl phosphate, diphenyl phosphate, monophenyl phosphate, dibutyl phosphate, dioctyl phosphate, monooctyl phosphate, and the like; phosphonic acids such as diphenyl phosphonic acid, dioctyl phosphonic acid, dibutyl phosphonic acid, and the like; phosphonic acid esters such as diethyl phenylphosphonate, and the like; phosphines such as triphenylphosphine, bis(diphenylphosphino)ethane, and the like; boric acids such as boric acid, phenylboric acid, and the like; aromatic sulfonic acid salts such as tetarabutylphosphonium dodecylbenzensulfonate salt, and the like; organic halides such as chloride stearate, benzoyl chloride, chloride p-toluenesulfonate, and the like; alkylsulfonic acids such as dimethylsulfonic acid, and the like; organic halides such as benzyl chloride, and the like; etc. These deactivators are used at 0.01 to 50 mol, preferably 0.3 to 20 mol, with respect to the catalyst. In the case where the content of the deactivator is smaller than 0.01 mol with respect to the catalyst, the deactivation effect is insufficient, which is not preferable. In the case where the content of the deactivator is larger than 50 mol with respect to the catalyst, the heat resistance of the resin is decreased and thus the molded body is easily colored, which is not preferable.

After the catalyst is deactivated, there may be a step of devolatilizing and removing a low boiling point compound in the polymer at a pressure of 0.1 to 1 mmHg at a temperature of 200 to 350° C. For this step, a horizontal device including a stirring blade having a high surface renewal capability such as a paddle blade, a lattice blade, an eye glass-type blade or the like, or a thin film evaporator is preferably usable.

The polycarbonate resin according to the present invention is desired to have a very small amount of foreign objects, and filtration of the melt materials, catalyst solution or the like is preferably performed. The mesh of the filter is preferably 5 µm or less, and more preferably 1 µm or less. It is preferred that the generated polymer is filtrated by a polymer filter. The mesh of the polymer filter is preferably 100 µm or less, and more preferably 30 µm or less. A step of sampling a resin pellet needs to be performed in a low dust environment, needless to say. The dust environment is preferably of class 6 or lower, and more preferably of class 5 or lower.

The polycarbonate resin may be molded by injection molding, compression molding, casting, roll processing, extrusion molding, extension or the like. The molding method is not limited to any of the above.

(4) Optical Molded Body

The polycarbonate resin according to the present invention is usable to produce an optical molded body. The optical molded body is molded by any method such as, for example, injection molding, compression molding, extrusion molding, solution casting or the like. The polycarbonate resin according to the present invention is high in moldability and heat resistance, and thus is advantageously usable for an optical lens for which injection molding is necessary. For molding, the polycarbonate resin according to the present invention may be mixed with another polycarbonate resin or another resin such as polyester resin or the like. An additive such as an antioxidant, a processing stabilizer, a photostabilizer, a polymerization metal deactivator, a flame retardant, a lubricant, an antistatic agent, a surfactant, an antibacterial agent, a releasing agent, an ultraviolet absorber, a plasticizer, a compatibilizer, or the like may be mixed.

Examples of the antioxidant include triethyleneglycol-bis[3-(3-tert-butyl-5-methyl-4-hydroxyphenyl)propionate], 1,6-hexanediol-bis[3-(3,5-di-tert-butyl-4-hydroxyphenyl) propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide, 3,5-di-tert-butyl-4-hydroxy-benzylphosphonate-diethylester, tris(3,5-di-tert-butyl-4-hydroxybenzyl)isocyanurate, and 3,9-bis{1,1-dimethyl-2-[β-(3-tert-butyl-4-hydroxy-5-methylphenyl)propionyloxy]ethyl}-2,4,8,10-tetraoxaspiro(5,5)undecane, and the like. The content of the antioxidant in the polycarbonate resin is preferably 0.001 to 0.3 parts by weight with respect to 100 parts by weight of the polycarbonate resin.

Examples of the processing stabilizer include a phosphorus-based processing stabilizer, a sulfur-based processing stabilizer, and the like. Examples of the phosphorus-based processing stabilizer include phosphorous acid, phosphoric acid, phosphonous acid, phosphonic acid, esters thereof, and the like. Specific examples thereof include triphenylphosphite, tris(nonylphenyl)phosphite, tris(2,4-di-tert-butylphenyl)phosphite, tris(2,6-di-tert-butylphenyl)phosphite, tridecylphosphite, trioctylphosphite, trioctadecylphosphite, didecylmonophenylphosphite, dioctylmonophenylphosphite, diisopropylmonophenylphosphite, monobutyldiphenylphosphite, monodecyldiphenylphosphite, monooctyldiphenylphosphite, bis(2,6-di-tert-butyl-4-methylphenyl)pentaerythritoldiphosphite, 2,2-methylenebis(4,6-di-tert-butylphenyl)octylphosphite, bis(nonylphenyl)pentaerythritoldiphosphite, bis(2,4-dicumylphenyl)pentaerythritoldiphosphite, bis(2,4-di-tert-butylphenyl)pentaerythritoldiphosphite, distearylpentaerythritoldiphosphite, tributylphosphate, triethylphosphate, trimethylphosphate, triphenylphosphate, diphenylmonoorthoxenylphosphate, dibutylphosphate, dioctylphosphate, diisopropylphosphate, dimethyl benzenephosphonate, diethyl benzenephosphonate, dipropyl benzenephosphonate, tetrakis(2,4-di-t-butylphenyl)-4,4'-biphenylenediphosphonite, tetrakis(2,4-di-t-butylphenyl)-4,3'-biphenylenediphosphonite, tetrakis(2,4-di-t-butylphenyl)-3,3'-biphenylenediphosphonite, bis(2,4-di-tert-butylphenyl)-4-phenyl-phenylphosphonite, bis(2,4-di-tert-butylphenyl)-3-phenyl-phenylphosphonite, and the like. The content of the phosphorus-based processing stabilizer in the polycarbonate resin is preferably 0.001 to 0.2 parts by weight with respect to 100 parts by weight of the polycarbonate resin.

Examples of the sulfur-based processing stabilizer include pentaerythritol-tetrakis(3-laurylthiopropionate), pentaerythritol-tetrakis(3-myristylthiopropionate), pentaerythritol-tetrakis(3-stearylthiopropionate), dilauryl-3,3'-thiodipropionate, dimyristyl-3,3'-thiodipropionate, distearyl-3,3'-thiodipropionate, and the like. The content of the sulfur-based processing stabilizer in the polycarbonate resin is preferably 0.001 to 0.2 parts by weight with respect to 100 parts by weight of the polycarbonate resin.

A preferable releasing agent contains at least 90% by weight of an ester of an alcohol and a fatty acid. Specific examples of the ester of an alcohol and a fatty acid include an ester of a monovalent alcohol and a fatty acid, and a partial ester or a total ester of a polyvalent alcohol and a fatty acid. A preferable example of the above-described ester of an alcohol and a fatty acid is an ester of a monovalent alcohol having a carbon number of 1 to 20 and a saturated fatty acid having a carbon number of 10 to 30. A preferable example of the partial or total ester of a polyvalent alcohol and a fatty acid is a partial or total ester of a polyvalent alcohol having a carbon number of 1 to 25 and a saturated fatty acid having a carbon number of 10 to 30.

Specific examples of the ester of a monovalent alcohol and a fatty acid include atearyl stearate, palmityl palmitate, butyl stearate, methyl laurate, isopropyl palmitate, and the like. Specific examples of the partial or total ester of a polyvalent alcohol and a fatty acid include monoglyceride stearate, monoglyceride stearate, diglyceride stearate, triglyceride stearate, monosorbitate stearate, monoglyceride behenate, monoglyceride caprylate, monoglyceride laurate, pentaerythritol monostearate, pentaerythritol tetrastearate, pentaerythritol tetrapelargonate, propyleneglycol monostearate, biphenyl biphenate, sorbitan monostearate, 2-ethylhexylstearate, total or partial esters of dipentaerythritol such as dipentaerythritol hexastearate and the like, etc. The content of the releasing agent is preferably 0.005 to 2.0 parts by weight, more preferably 0.01 to 0.6 parts by weight, and still more preferably 0.02 to 0.5 parts by weight, with respect to 100 parts by weight of the polycarbonate resin.

A preferable example of the ultraviolet absorber is at least one selected from the group consisting of a benzotriazole-based ultraviolet absorber, a benzophenone-based ultraviolet absorber, a triazine-based ultraviolet absorber, a cyclic iminoester-based ultraviolet absorber, and a cyanoacrylate-based ultraviolet absorber. Namely, the following ultraviolet absorbers may be used independently or in a combination of two or more.

Examples of the benzotriazole-based ultraviolet absorber include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazole-2-yl)phenol)], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazine-4-one), 2-[2-hydroxy-3-(3,4,5,6-tetrahydrophthalimidemethyl)-5-methylphenyl]benzotriazole, and the like.

Examples of the benzophenone-based ultraviolet absorber include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxybenzophenone-5-sulfonic acid hydrate, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-di methoxy-5-sodiumsulfoxybenzophenone, bis(5-benzoyl-4-hydroxy-2-methoxyphenyl)methane, 2-hydroxy-4-n-dodecyloxybenzophenone, 2-hydroxy-4-methoxy-2'-carboxybenzophenone, and the like.

Examples of the triazine-based ultraviolet absorber include 2-(4,6-diphenyl-1,3,5-triazine-2-yl)-5-([(hexyl)oxy]-phenol, 2-(4,6-bis(2,4-dimethylphenyl)-1,3,5-triazine-2-yl)-5-([(octyl)oxy]-phenol, and the like.

Examples of the cyclic iminoester-based ultraviolet absorber include 2,2'-bis(3,1-benzoxazine-4-one), 2,2'-p-phenylenebis(3,1-benzoxazine-4-one), 2,2'-m-phenylenebis(3,1-benzoxazine-4-one), 2,2'-(4,4'diphenylene)bis(3,1-benzoxazine-4-one), 2,2'-(2,6-naphthalene)bis(3,1-benzoxazine-4-one), 2,2'-(1,5-naphthalene)bis(3,1-benzoxazine-4-one), 2,2'-(2-methyl-p-phenylene)bis(3,1-benzoxazine-4-one), 2,2'-(2-nitro-p-phenylene)bis(3,1-benzoxazine-4-one), 2,2'-(2-chloro-p-phenylene)bis(3,1-benzoxazine-4-one), and the like.

Examples of the cyanoacrylate-based ultraviolet absorber include 1,3-bis-[(2'-cyano-3',3'-diphenylacryloyl)oxy]-2,2-bis[(2-cyano-3,3-diphenylacryloyl)oxy]methyl)propane, 1,3-bis-[(2-cyano-3,3-diphenylacryloyl)oxy]benzene, and the like.

The content of the ultraviolet absorber is preferably 0.01 to 3.0 parts by weight, more preferably 0.02 to 1.0 parts by weight, and still preferably 0.05 to 0.8 parts by weight, with respect to 100 parts by weight of the polycarbonate resin. The ultraviolet absorber contained in such a range of content in accordance with the use may provide a sufficient climate resistance to the polycarbonate resin.

The polycarbonate resin according to the present invention has a high refractive index and a low Abbe number, and is advantageously usable for an optical molded body suitable as a structural member or a functional member of a transparent conductive substrate usable for a liquid crystal display, an organic EL display, a solar cell or the like, and of an optical item such as an optical disc, a liquid crystal panel, an optical card, an optical sheet, an optical film, an optical fiber, an optical connector, a deposition plastic reflective mirror, a display or the like, as well as for an optical lens.

A surface of the optical molded body may be optionally covered with a coating layer such as a reflection preventive layer, a hard coating layer or the like. The reflection preventive layer may have a single layer structure or a multi-layer structure. The reflection preventive layer may be formed of an organic material or an inorganic material. Preferably, the reflection preventive layer is formed of an inorganic material. Specific examples of material usable for the reflection preventive layer include oxides such as silicon oxide, aluminum oxide, zirconium oxide, titanium oxide, cerium oxide, magnesium oxide, and the like; and fluorides such as magnesium fluoride, and the like.

(5) Optical Lens

The optical lens produced by use of the polycarbonate resin according to the present invention has a high refractive index and a low Abbe number, and is highly moisture and heat resistant. Therefore, the optical lens is usable in the field in which a costly glass lens having a high refractive index is conventionally used, such as for a telescope, binoculars, a TV projector and the like, and thus is highly useful. It is preferred that the optical lens is used in the form of an aspherical lens optionally. Merely one aspherical lens may make the spherical aberration substantially zero. Therefore, it is not necessary to use a plurality of spherical lenses to remove the spherical aberration. This decreases the weight and the production cost of an item including the spherical aberration. An aspherical lens is useful especially as a camera lens among various types of optical lenses.

The optical lens is molded by any method such as injection molding, compression molding, injection compression molding or the like. The present invention easily provides an aspherical lens having a high refractive index and a low level of birefringence, which is technologically difficult to produce by processing glass.

In order to avoid foreign objects from being incorporated into the optical lens as much as possible, the molding needs to be performed in a low dust environment, needless to say. The dust environment is preferably of class 6 or lower, and more preferably of class 5 or lower.

(6) Optical Film

An optical film produced by use of the polycarbonate resin according to the present invention is high in transparency and heat resistance, and therefore is preferably usable for a liquid crystal substrate film, an optical memory card or the like.

In order to avoid foreign objects from being incorporated into the optical film as much as possible, the molding needs to be performed in a low dust environment, needless to say. The dust environment is preferably of class 6 or lower, and more preferably of class 5 or lower.

EXAMPLES

2) Refractive index (nD): The refractive index of a film having a thickness of 0.1 mm formed of a polycarbonate resin produced in an example was measured by use of an Abbe refractive index meter by a method of JIS-K-7142.

3) Abbe number (ν): The refractive index of a film having a thickness of 0.1 mm formed of a polycarbonate resin produced in an example was measured by use of an Abbe refractive index meter at 23° C. at wavelengths of 486 nm, 589 nm and 656 nm. Then, the Abbe number was calculated by use of the following equation.

$\nu = (nD-1)/(nF-nC)$ nD: refractive index at a wavelength of 589 nm
nC: refractive index at a wavelength of 656 nm
nF: refractive index at a wavelength of 486 nm 4) Glass transition temperature (Tg): The glass transition temperature was measured by a differential scanning calorimeter (DSC).

5) Total light transmittance: The total light transmittance of a plate having a thickness of 3 mm, formed of the polycarbonate resin, produced for measuring the b value described below was measured by use of SE2000 spectral color difference meter produced by Nippon Denshoku Industries Co., Ltd. by a method of JIS-K-7361-1.

6) b value: The produced resin was dried at 120° C. for 4 hours in vacuum, and then injection-molded by an injection molding device (FANUC ROBOSHOT α-S30iA) at a cylinder temperature of 270° C. and a mold temperature of Tg–10° C. to obtain a disc-shaped test plate piece having a diameter of 50 mm and a thickness of 3 mm. This plate piece was used to measure the b value by a method according to JIS-K7105. As the b value is smaller, the plate is less yellowish and thus the hue is better. For measuring the molded plate, SE2000 spectral color difference meter produced by Nippon Denshoku Industries Co., Ltd. was used.

7) Amount of vinyl terminal group: 1H-NMR measurement was performed under the following conditions.

<1H-NMR Measurement Conditions>

Device: AVANZE III HD 500 MHz produced by Bruker
Flip angle: 30 degrees
Wait time: 1 second
Accumulate number of times: 500 times
Measurement temperature: room temperature (298K)
Concentration: 5 wt %
Solvent: Deuterated chloroform
Inner standard substance: tetramethylsilane (TMS) 0.05 wt %

8) Measurement of amounts of phenol and diphenylcarbonate (DPC) in the polycarbonate resin 0.5 g of sample in example 1, described below in detail, was dissolved in 50 ml of tetrahydrofuran to obtain a sample solution. A calibration curve was created from a pure form of each of compounds as a preparation. 2 μL of sample solution was quantitated by LC-MS under the following measurement conditions. The detection limit under the measurement conditions is 0.01 ppm.

<LC-MS Measurement Conditions>

Measurement device (LC part): Agilent Infinity 1260 LC System
Column: ZORBAX Eclipse XDB-18 and guard cartridge
Mobile phase:
A: 0.01 mol/L—aqueous solution of ammonium acetate
B: 0.01 mol/L—methanol solution of ammonium acetate
C: THF
Gradient program of the mobile phase:

As shown in Table 1, mixtures A through C were used as mobile phases. The mobile phases were caused to flow in the column for 30 minutes while the compositions of the mobile phases were switched when the time (minutes) shown in Table 1 lapsed.

TABLE 1

| Time | Mobile Phase Composition (% by Volume) | | |
|---|---|---|---|
| (min.) | A | B | C |
| 0 | 10 | 75 | 15 |
| 10.0 | 9 | 67.5 | 23.5 |
| 10.1 | 0 | 25 | 75 |
| 30.0 | 0 | 25 | 75 |

Flow rate: 0.3 ml/min.

Column temperature: 45° C.

Detector: UV (225 nm)

Measurement device (MS part): Agilent 6120 single quad LCMS System

Ionization source: ESI

Polarity: Positive (DPC) and negative (PhOH)

Fragmentor: 70 V

Dry gas: 10 L/min., 350° C.

Nebulizer: 50 psi

Capillary voltage: 3000 V (positive), 2500 V (negative)

Ion measured

TABLE 2

| Monomer | Ion Type | m/z |
|---|---|---|
| PhOH | $[M - H]^-$ | 93.1 |
| DPC | $[M + NH_4]^+$ | 232.1 |

Amount of injected sample: 2 μL

Production of Polycarbonate Resin

Example 1

31.6 kg (60.0 mol) of 2,2'-bis(2-hydroxyethoxy)-6,6'-diphenyl-1,1'-binaphthalene (hereinafter, may be referred to simply as "BINL-2EO"), 13.5 kg (63.0 mol) of diphenylcarbonate (hereinafter, may be referred to simply as "DPC"), 0.074 g ($8.8 \times 10^{-4}$ mol) of sodium hydrogen carbonate as materials were put into a 50 L reactor including a stirrer and a distillation device, and were heated to 180° C. in a nitrogen atmosphere of 760 mmHg. Twenty minutes after the heating was started, the materials were confirmed to be completely melted, and the materials were stirred for 120 minutes under the same conditions. Then, the pressure was adjusted to 200 mmHg, and at the same time, the temperature was raised to 200° C. at a rate of 60° C./hr. At this point, it was confirmed that phenol generated as a byproduct started to be distilled. Then, the materials were maintained at 200° C. for 40 minutes to cause a reaction. Then, the temperature was raised to 240° C. at a rate of 75° C./hr. Ten minutes after the temperature rise was finished, the pressure was adjusted to 1 mm Hg or lower over 1 hour while the temperature was maintained at 240° C. Then, the temperature was raised to 245° C. at a rate of 60° C./h r, and the materials were stirred for 30 minutes. After the reaction was finished, nitrogen was introduced into the reactor to return the pressure to room pressure, and the generated polycarbonate was removed while being pelletized. The amounts of phenol and diphenylcarbonate (DPC), as impurities in the obtained polycarbonate resin, were measured as described above. The phenol was 100 ppm by mass and DPC was 300 ppm by mass in the resin. The properties of the obtained resin are shown in Table 3.

Example 2-A

Substantially the same operation was performed as in example 1 except that 7.9 kg (15.0 mol) of BINL-2EO, 24.2 kg (45.0 mol) of BNEF, and 13.5 kg (63.0 mol) of DPC were used as materials.

Example 2-B

Substantially the same operation was performed as in example 1 except that 15.8 kg (30.0 mol) of BINL-2EO, 16.2 kg (30.0 mol) of BNEF, and 13.5 kg (63.0 mol) of DPC were used as materials.

Example 2-C

Substantially the same operation was performed as in example 1 except that 23.7 kg (45.0 mol) of BINL-2EO, 8.1 kg (15.0 mol) of BNEF, and 13.5 kg (63.0 mol) of DPC were used as materials.

Properties of the obtained resin are shown in Table 3. FIG. 1 is an NMR chart of the resin obtained in example 2-B (BINOL-2EO/BNEF=50 mol/50 mol).

Example 3-A

Substantially the same operation was performed as in example 1 except that 7.9 kg (15.0 mol) of BINL-2EO, 19.0 kg (45.0 mol) of 9,9-bis[4-(2-hydroxyethoxy)phenyl]fluorene (hereinafter, may be referred to simply as "BPEF"), and 13.5 kg (63.0 mol) of DPC were used as materials. Properties of the obtained resin are shown in Table 3.

Example 3-B

Substantially the same operation was performed as in example 1 except that 15.8 kg (30.0 mol) of BINL-2EO, 12.7 kg (30.0 mol) of 9,9-bis[4-(2-hydroxyethoxy)phenyl]fluorene (hereinafter, may be referred to simply as "BPEF"), and 13.5 kg (63.0 mol) of DPC were used as materials. Properties of the obtained resin are shown in Table 3.

Example 3-C

Substantially the same operation was performed as in example 1 except that 23.7 kg (45.0 mol) of BINL-2EO, 6.3 kg (15.0 mol) of 9,9-bis[4-(2-hydroxyethoxy)phenyl]fluorene (hereinafter, may be referred to simply as "BPEF"), and 13.5 kg (63.0 mol) of DPC were used as materials. Properties of the obtained resin are shown in Table 3.

Example 4-A

Substantially the same operation was performed as in example 1 except that 7.9 kg (15.0 mol) of BINL-2EO, 25.9 kg (45.0 mol) of BPPEF, and 13.5 kg (63.0 mol) of DPC were used as materials. Properties of the obtained resin are shown in Table 3.

Example 4-B

Substantially the same operation was performed as in example 1 except that 15.8 kg (30.0 mol) of BINL-2EO, 17.2 kg (30.0 mol) of BPPEF, and 13.5 kg (63.0 mol) of DPC were used as materials. Properties of the obtained resin are shown in Table 3.

Example 4-C

Substantially the same operation was performed as in example 1 except that 23.7 kg (30.0 mol) of BINL-2EO, 8.6 kg (15.0 mol) of BPPEF, and 13.5 kg (63.0 mol) of DPC were used as materials. Properties of the obtained resin are shown in Table 3.

Example 5

Substantially the same operation was performed as in example 1 except that 7.6 kg (18.0 mol) of BPEF, 26.3 kg (42.0 mol) of 2,2'-bis(2-hydroxyethoxy)-6,6'-di(naphthalene-1-yl)-1,1'-binaphthalene (hereinafter, may be referred to simply as "DNBINOL-2EO"), and 13.5 kg (63.0 mol) of DPC were used as materials. Properties of the obtained resin are shown in Table 3.

Example 6-A

Substantially the same operation was performed as in example 1 except that 7.9 kg (15.0 mol) of BINL-2EO, 9.7 kg (18.0 mol) of BNEF, 10.1 kg (27.0 mol) of 2,2'-bis(2-hydroxyethoxy)-1,1'-binaphthalene (hereinafter, may be referred to simply as "BNE"), and 13.5 kg (63.0 mol) of DPC were used as materials. Properties of the obtained resin are shown in Table 3.

Example 6-B

Substantially the same operation was performed as in example 1 except that 19.0 kg (36.0 mol) of BINL-2EO, 4.5 kg (12.0 mol) of BNE, 5.1 kg (12.0 mol) of BPEF, and 13.5 kg (63.0 mol) of DPC were used as materials. Properties of the obtained resin are shown in Table 3.

Example 6-C

Substantially the same operation was performed as in example 1 except that 19.0 kg (36.0 mol) of BINL-2EO, 4.5 kg (12.0 mol) of BNE, 6.9 kg (12.0 mol) of BPPEF, and 13.5 kg (63.0 mol) of DPC were used as materials. Properties of the obtained resin are shown in Table 3.

Example 6-D

Substantially the same operation was performed as in example 1 except that 11.3 kg (21.0 mol) of BNEF, 11.2 kg (30.0 mol) of BNE, 5.6 kg (9.0 mol) of DNBINOL-2EO, and 13.5 kg (63.0 mol) of DPC were used as materials. Properties of the obtained resin are shown in Table 3.

Example 6-E

Substantially the same operation was performed as in example 1 except that 6.7 kg (18.0 mol) of BNE, 17.2 kg (30.0 mol) of BPPEF, 7.5 kg (12.0 mol) of DNBINOL-2EO, and 13.5 kg (63.0 mol) of DPC were used as materials. Properties of the obtained resin are shown in Table 3.

Example 6-F

Substantially the same operation was performed as in example 1 except that 6.7 kg (18.0 mol) of BNE, 10.1 kg (24.0 mol) of BPEF, 11.3 kg (18.0 mol) of DNBINOL-2EO, and 13.5 kg (63.0 mol) of DPC were used as materials. Properties of the obtained resin are shown in Table 3.

Example 7

Substantially the same operation was performed as in example 1 except that 32.0 kg (51.0 mol) of 2,2'-bis(2-hydroxyethoxy)-6,6'-di(naphthalene-2-yl)-1,1'-binaphthalene (2DNBINOL-2EO), 3.8 kg (9.0 mol) of BPEF, and 13.5 kg (63.0 mol) of DPC were used as materials. Properties of the obtained resin are shown in Table 3.

Example 7-A

Substantially the same operation was performed as in example 1 except that 18.8 kg (30.0 mol) of 2,2'-bis(2-hydroxyethoxy)-6,6'-di(naphthalene-2-yl)-1,1'-binaphthalene (2DNBINOL-2EO), 12.7 kg (30.0 mol) of BPEF, and 13.5 kg (63.0 mol) of DPC were used as materials. Properties of the obtained resin are shown in Table 3.

Example 7-B

Substantially the same operation was performed as in example 1 except that 5.6 kg (90.0 mol) of 2,2'-bis(2-hydroxyethoxy)-6,6'-di(naphthalene-2-yl)-1,1'-binaphthalene (2DNBINOL-2EO), 21.5 kg (51.0 mol) of BPEF, and 13.5 kg (63.0 mol) of DPC were used as materials. Properties of the obtained resin are shown in Table 3.

Example 8

Substantially the same operation was performed as in example 1 except that 37.1 kg (51.0 mol) of 2,2'-bis(2-hydroxyethoxy)-6,6'-di(phenanthrene-9-yl)-1,1'-binaphthalene (9DPNBINOL-2EO), 3.8 kg (9.0 mol) of BPEF, and 13.5 kg (63.0 mol) of DPC were used as materials. Properties of the obtained resin are shown in Table 3.

Example 8-A

Substantially the same operation was performed as in example 1 except that 21.8 kg (30.0 mol) of 2,2'-bis(2-hydroxyethoxy)-6,6'-di(phenanthrene-9-yl)-1,1'-binaphthalene (9DPNBINOL-2EO), 12.7 kg (30.0 mol) of BPEF, and 13.5 kg (63.0 mol) of DPC were used as materials. Properties of the obtained resin are shown in Table 3.

Example 8-B

Substantially the same operation was performed as in example 1 except that 6.5 kg (9.0 mol) of 2,2'-bis(2-hydroxyethoxy)-6,6'-di(phenanthrene-9-yl)-1,1'-binaphthalene (9DPNBINOL-2EO), 21.5 kg (51.0 mol) of BPEF, and 13.5 kg (63.0 mol) of DPC were used as materials. Properties of the obtained resin are shown in Table 3.

Example 9

Substantially the same operation was performed as in example 1 except that 10.4 kg (18.0 mol) of 6,6'-di-(3-cyanophenyl)-2,2'-bis-(2-hydroxyethoxy)-1,1'-binaphthalene (CN-BNA), 18.4 kg (42.0 mol) of BPEF, and 13.5 kg (63.0 mol) of DPC were used as materials. Properties of the obtained resin are shown in Table 3.

Example 10

Substantially the same operation was performed as in example 1 except that 12.7 kg (18.0 mol) of 6,6'-di-(dibenzo[b,d]furan-4-yl)-2,2'-bis-(2-hydroxyethoxy)-1,1'-binaphthalene (FUR-BNA), 18.4 kg (42.0 mol) of BPEF, and 13.5 kg (63.0 mol) of DPC were used as materials. Properties of the obtained resin are shown in Table 3.

Example 11

Substantially the same operation was performed as in example 1 except that 13.3 kg (18.0 mol) of 6,6'-di-(dibenzo[b,d]thien-4-yl)-2,2'-bis-(2-hydroxyethoxy)-1,1'-binaphthalene (THI-BNA), 18.4 kg (42.0 mol) of BPEF, and 13.5 kg (63.0 mol) of DPC were used as materials. Properties of the obtained resin are shown in Table 3.

Comparative Example 1

Substantially the same operation was performed as in example 1 except that 22.5 kg (60.0 mol) of BNE and 13.5 kg (63.0 mol) of DPC were used as materials. Properties of the obtained resin are shown in Table 3.

| | COMPOSITION RATIO | | | | | | | | | | |
|---|---|---|---|---|---|---|---|---|---|---|---|
| | BINL-2EO MOL % | BNEF MOL % | BNE MOL % | BREF MOL % | BPREF MOL % | DNBINOL-2EO MOL % | 2DNBINOL-2EO MOL % | 9DPNBINOL-2EO MOL % | CN-BNA MOL % | FUR-BNA MOL % | THI-BNA MOL % |
| EX. 1 | 100 | 0 | 0 | 0 | 0 | 0 | 0 | 0 | 0 | 0 | 0 |
| EX. 2-A | 25 | 75 | 0 | 0 | 0 | 0 | 0 | 0 | 0 | 0 | 0 |
| EX. 2-B | 50 | 50 | 0 | 0 | 0 | 0 | 0 | 0 | 0 | 0 | 0 |
| EX. 2-C | 75 | 25 | 0 | 0 | 0 | 0 | 0 | 0 | 0 | 0 | 0 |
| EX. 3-A | 25 | 0 | 0 | 75 | 0 | 0 | 0 | 0 | 0 | 0 | 0 |
| EX. 3-B | 50 | 0 | 0 | 50 | 0 | 0 | 0 | 0 | 0 | 0 | 0 |
| EX. 3-C | 75 | 0 | 0 | 25 | 0 | 0 | 0 | 0 | 0 | 0 | 0 |
| EX. 4-A | 25 | 0 | 0 | 0 | 75 | 0 | 0 | 0 | 0 | 0 | 0 |
| EX. 4-B | 50 | 0 | 0 | 0 | 50 | 0 | 0 | 0 | 0 | 0 | 0 |
| EX. 4-C | 75 | 0 | 0 | 0 | 25 | 0 | 0 | 0 | 0 | 0 | 0 |
| EX. 5 | 0 | 0 | 0 | 30 | 0 | 70 | 0 | 0 | 0 | 0 | 0 |
| EX. 6-A | 25 | 30 | 45 | 0 | 0 | 0 | 0 | 0 | 0 | 0 | 0 |
| EX. 6-B | 60 | 0 | 20 | 20 | 0 | 0 | 0 | 0 | 0 | 0 | 0 |
| EX. 6-C | 60 | 0 | 20 | 0 | 20 | 0 | 0 | 0 | 0 | 0 | 0 |
| EX. 6-D | 0 | 35 | 50 | 0 | 0 | 15 | 0 | 0 | 0 | 0 | 0 |
| EX. 6-E | 0 | 0 | 30 | 0 | 50 | 20 | 0 | 0 | 0 | 0 | 0 |
| EX. 6-F | 0 | 0 | 30 | 40 | 0 | 30 | 0 | 0 | 0 | 0 | 0 |
| EX. 7 | 0 | 0 | 0 | 15 | 0 | 0 | 85 | 0 | 0 | 0 | 0 |
| EX. 7-A | 0 | 0 | 0 | 50 | 0 | 0 | 50 | 0 | 0 | 0 | 0 |
| EX. 7-B | 0 | 0 | 0 | 85 | 0 | 0 | 15 | 0 | 0 | 0 | 0 |
| EX. 8 | 0 | 0 | 0 | 15 | 0 | 0 | 0 | 85 | 0 | 0 | 0 |
| EX. 8-A | 0 | 0 | 0 | 50 | 0 | 0 | 0 | 50 | 0 | 0 | 0 |
| EX. 8-B | 0 | 0 | 0 | 85 | 0 | 0 | 0 | 15 | 0 | 0 | 0 |
| EX. 9 | 0 | 0 | 0 | 70 | 0 | 0 | 0 | 0 | 30 | 0 | 0 |
| EX. 10 | 0 | 0 | 0 | 70 | 0 | 0 | 0 | 0 | 0 | 30 | 0 |
| EX. 11 | 0 | 0 | 0 | 70 | 0 | 0 | 0 | 0 | 0 | 0 | 30 |
| COMPARATIVE EX. 1 | 0 | 0 | 100 | 0 | 0 | 0 | 0 | 0 | 0 | 0 | 0 |

| | PROPERTIES | | | | | | | AFTER PCT TEST |
|---|---|---|---|---|---|---|---|---|
| | Mv — | Tg °C. | REFRACTIVE INDEX (nD) — | ABBE NUMBER (v) — | TOTAL LIGHT TRANSMITTANCE % | b VALUE — | MOLDABILITY — | TOTAL LIGHT TRANSMITTANCE % |
| EX. 1 | 11,300 | 162 | 1.697 | 15 | 87 | 4.2 | C | 87 |
| EX. 2-A | 11,600 | 183 | 1.688 | 18 | 87 | 4.2 | B | 87 |
| EX. 2-B | 11,900 | 175 | 1.690 | 17 | 87 | 4.1 | A | 87 |
| EX. 2-C | 11,300 | 169 | 1.694 | 16 | 87 | 4.0 | B | 87 |
| EX. 3-A | 12,400 | 150 | 1.655 | 20 | 88 | 4.1 | B | 88 |
| EX. 3-B | 11,700 | 154 | 1.670 | 18 | 88 | 4.0 | A | 88 |
| EX. 3-C | 12,000 | 158 | 1.684 | 16 | 88 | 4.0 | B | 88 |
| EX. 4-A | 11,500 | 157 | 1.665 | 20 | 88 | 4.1 | B | 88 |
| EX. 4-B | 11,700 | 159 | 1.675 | 18 | 88 | 4.1 | B | 88 |
| EX. 4-C | 11,200 | 161 | 1.685 | 17 | 88 | 4.0 | B | 88 |
| EX. 5 | 11,200 | 168 | 1.697 | 16 | 87 | 4.3 | C | 87 |
| EX. 6-A | 12,200 | 148 | 1.682 | 18 | 88 | 4.1 | A | 88 |
| EX. 6-B | 11,800 | 149 | 1.682 | 17 | 87 | 4.0 | B | 87 |
| EX. 6-C | 12,100 | 152 | 1.683 | 17 | 87 | 4.1 | B | 87 |
| EX. 6-D | 11,900 | 149 | 1.684 | 18 | 87 | 4.1 | A | 87 |
| EX. 6-E | 11,600 | 149 | 1.672 | 19 | 88 | 4.2 | B | 88 |
| EX. 6-F | 12,300 | 146 | 1.676 | 18 | 87 | 4.2 | B | 87 |
| EX. 7 | 12200 | 192 | 1.73 | 13 | 87 | 4.1 | B | 87 |
| EX. 7-A | 12300 | 173 | 1.698 | 15 | 87 | 4.2 | A | 87 |
| EX. 7-B | 12400 | 154 | 1.659 | 20 | 87 | 4.2 | B | 87 |
| EX. 8 | 11900 | 196 | 1.718 | 15 | 87 | 4.2 | B | 87 |
| EX. 8-A | 12000 | 177 | 1.693 | 17 | 87 | 4.2 | A | 87 |
| EX. 8-B | 12100 | 155 | 1.658 | 20 | 87 | 4.2 | B | 87 |
| EX. 9 | 12000 | 141 | 1.66 | 19 | 88 | 4.2 | A | 88 |
| EX. 10 | 12100 | 154 | 1.675 | 19 | 88 | 4.2 | A | 88 |
| EX. 11 | 12000 | 159 | 1.679 | 19 | 88 | 4.1 | A | 87 |
| COMPARATIVE EX. 1 | 11,000 | 115 | 1.668 | 19 | 86 | 4.4 | D | 86 |

EXAMPLES

BINL-2EO 2,2'-bis(2-hydroxyethoxy)6,6'-diphenyl-1,1'-binaphthalene
BNEF 9,9-bis(6-(2-hydroxyethoxy)naphthalene-2-yl)fluorene
BNE 2,2'-bis(2-hydroxyethoxy)-1,1'-binaphthalene
BPEF 9,9-bis(4-(2-hydroxyethoxy)phenyl)fluorene
BPPEF 9,9-bis(4-(2-hydroxyethoxy)-3-phenylphenyl)fluorene
DNBINOL-2EO 2,2'-bis(2-hydroxyethoxy)-6,6'-di(naphthalene-1-yl)-1,1'-binaphthalene
2DNBINOL-2EO 2,2'-bis(2-hydroxyethoxy)-6,6'-di(naphthalene-2-yl)-1,1'-binaphthalene 9DPNBINOL-2EO 2,2'-bis(2-hydroxyethoxy)-6,6'-di(phenanthrene-9-yl)-1,1'-binaphthalene
CN-BNA 6,6'-di-(3-cyanophenyl)-2,2'-bis-(2-hydroxyethoxy)-1,1'-binaphthalene
FUR-BNA 6,6'-di-(dibenzo[b,d]furan-4-yl)-2,2'-bis-(2-hydroxyethoxy)-1,1'-binaphthalene
THI-BNA 6,6'-di-(dibenzo[b,d]thien-4-yl)-2,2'-bis-(2-hydroxyethoxy)-1,1'-binaphthalene

COMPARATIVE EXAMPLE

BNE 2,2'-bis(2-hydroxyethoxy)-1,1'-binaphthalene
[Moldability]
A: There is no pore in the molded piece, and the surface is not waved.
B: There are pores in the molded piece.
C: The surface of the molded piece is waved.
D: There are pores in the molded piece, and the surface is deformed.

[Chemical formula 29]

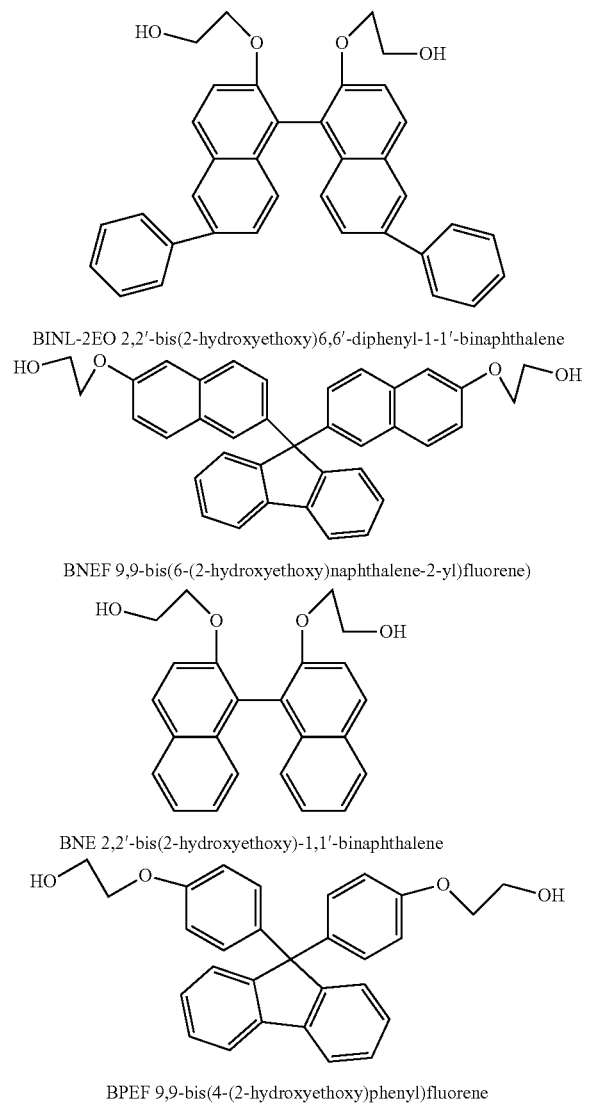

BINL-2EO 2,2'-bis(2-hydroxyethoxy)6,6'-diphenyl-1-1'-binaphthalene

BNEF 9,9-bis(6-(2-hydroxyethoxy)naphthalene-2-yl)fluorene)

BNE 2,2'-bis(2-hydroxyethoxy)-1,1'-binaphthalene

BPEF 9,9-bis(4-(2-hydroxyethoxy)phenyl)fluorene

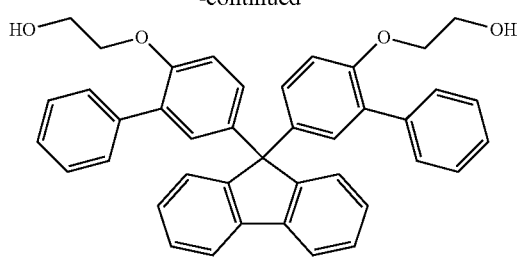

BPPEF 9,9-bis(4-(2-hydroxyethoxy)-3-phenylphenyl)fluorene

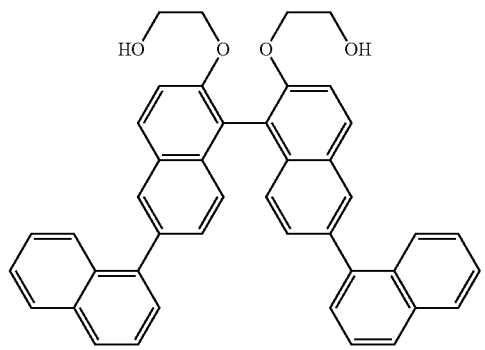

DNBINOL-2EO 2,2'-bis(2-hydroxyethoxy)-6,6'-di(naphthalene-1-yl)-1,1'-binaphthalene

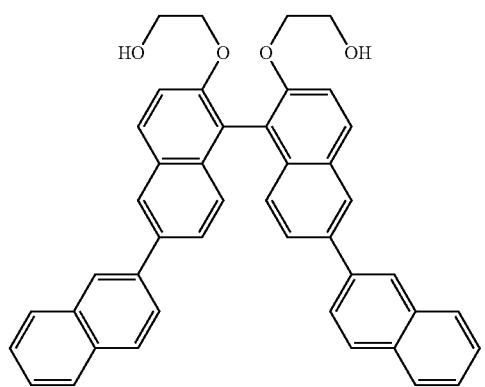

2DNBINOL-2EO 2,2'-bis(2-hydroxyethoxy)-6,6'-di(naphthalene-2-yl)-1,1'-binaphthalene

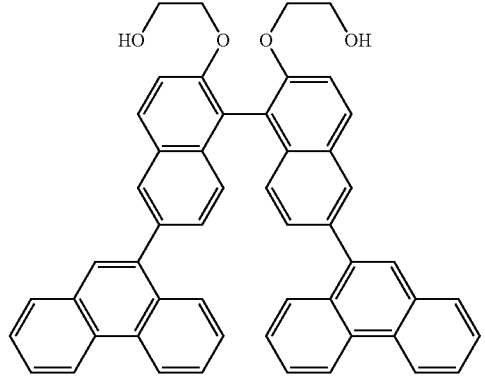

9DNBINOL-2EO 2,2'-bis(2-hydroxyethoxy)-6,6'-di(phenanthrene-9-yl)-1,1'-binaphthalene

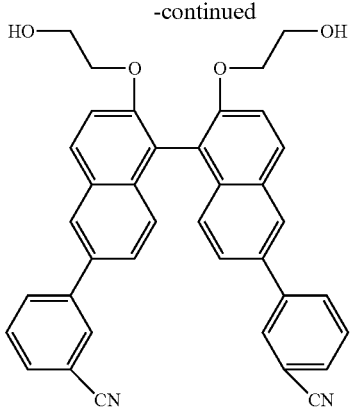

CN-BNA
6,6'-di-(3-cyanophenyl)-2,2'-bis-(2-hydroxyethoxy)-1,1'-binaphthalene

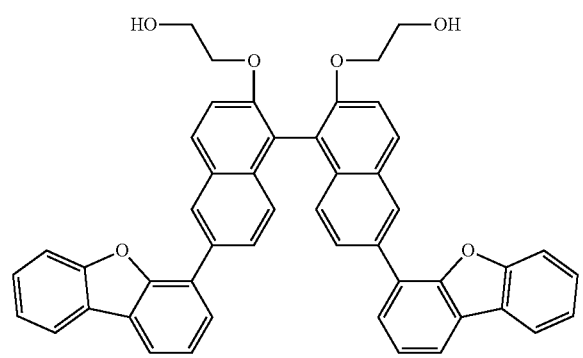

FUR-BNA
6,6'-di-(dibenzo[b,d]furan-4-yl)-2,2'-bis-(2-hydroxyethoxy)-1,1'-binaphthalene

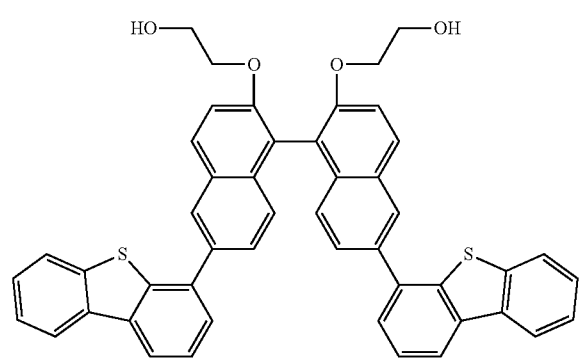

THI-BNA
6,6'-di-(dibenzo[b,d]thien-4-yl)-2,2'-bis-(2-hydroxyethoxy)-1,1'-binaphthalene

The invention claimed is:

1. A polycarbonate resin, comprising a structural unit expressed by general formula (1) below:

[Chemical formula 1]

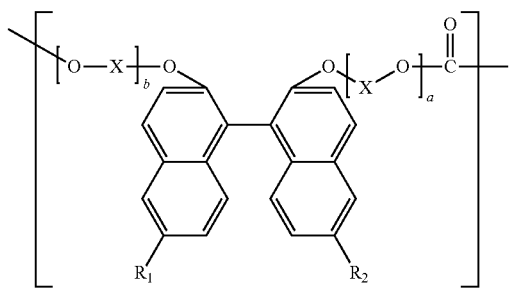

(where $R_1$ and $R_2$ independently represent a hydrogen atom, a fluorine atom, a chlorine atom, a bromine atom, an iodine atom, an alkyl group having a carbon number of 1 to 6, a mono- or polycyclic aryl group having a carbon number of 6 to 36, a mono- or polycyclic hetaryl having a total of 5 to 36 atoms, which are ring members, where 1, 2, 3 or 4 of these atoms are selected from nitrogen, sulfur and oxygen, while the remainder of these atoms are carbon atoms, an alkenyl group having a carbon number of 2 to 6, an alkoxy group having a carbon number of 1 to 6, or an aralkyl group having a carbon number of 7 to 17, where the mono- or polycyclic aryl and mono- or polycyclic hetaryl are unsubstituted or carry 1 or 2 radicals Ra, which are selected from the group consisting of CN, $CH_3$, $OCH_3$, O-phenyl, O-naphthyl, S-phenyl, S-naphthyl and halogen, where $R_1$ and $R_2$ do not all represent a hydrogen atom;

X represents an alkylene group having a carbon number of 1 to 8, a cycloalkylene group having a carbon number of 5 to 12 or an arylene group having a carbon number of 6 to 20;

where alkylene group and cycloalkylene group are unsubstituted or carry a phenyl ring, and a and b each represent an integer of 1 to 10).

2. The polycarbonate resin according to claim 1, wherein the polycarbonate resin includes the structural unit expressed by general formula (1) at more than 50 mol %.

3. The polycarbonate resin according to claim 1, wherein at least one of $R_1$ and $R_2$ in general formula (1) is an aryl group having a carbon number of 6 to 20.

4. The polycarbonate resin according to claim 3, wherein at least two of $R_1$ and $R_2$ in general formula (1) are each an aryl group having a carbon number of 6 to 14.

5. The polycarbonate resin according to claim 1, wherein the structural unit expressed by general formula (1) includes at least any one of structural units expressed by general formulas (A-1) through (A-7) below:
[Chemical formula 2]
(A-1)
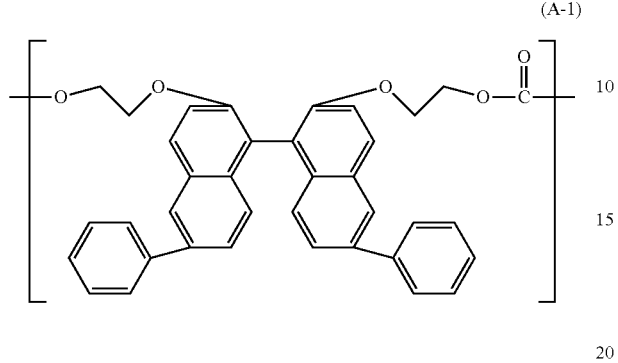
[Chemical formula 3]
(A-2)
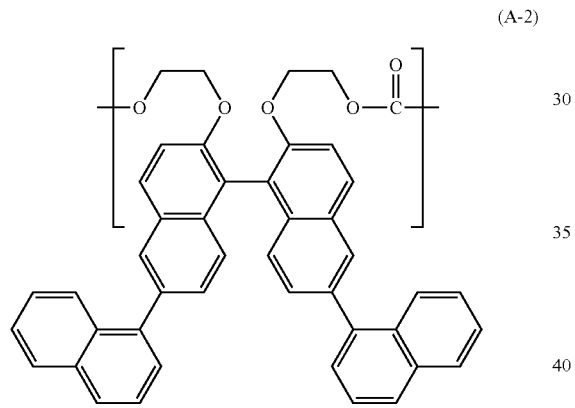
[Chemical formula 4]
(A-3)
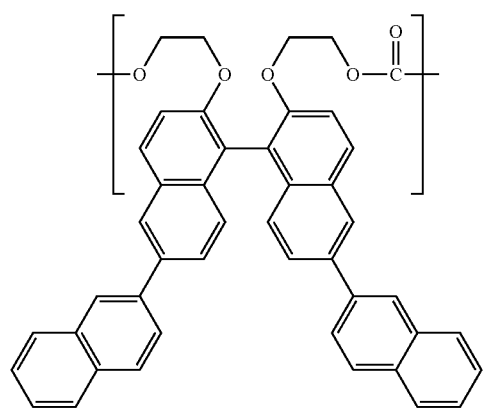
-continued
[Chemical formula 5]
(A-4)
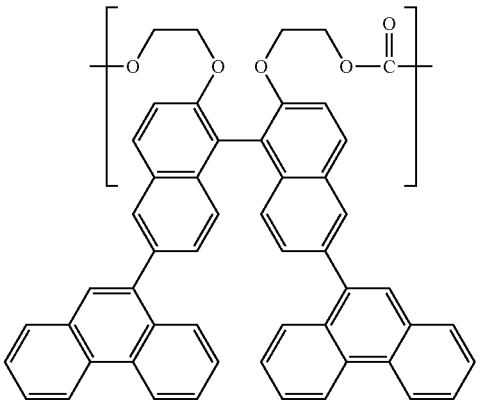
[Chemical formula 6]
(A-5)
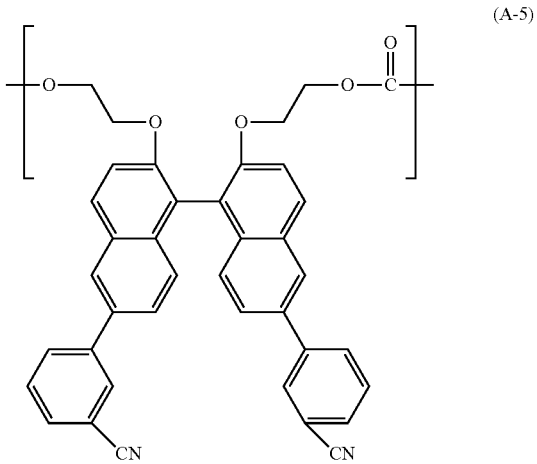
[Chemical formula 7]
(A-6)
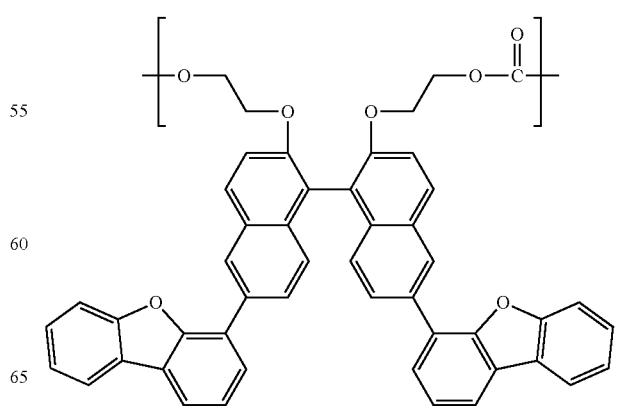

[Chemical formula 8]

(A-7)

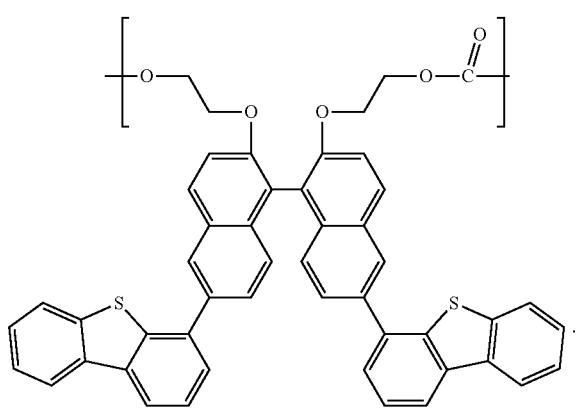

6. The polycarbonate resin according to claim 1, further comprising at least one of structural units expressed by general formulas (2) and (3) below:

[Chemical formula 9]

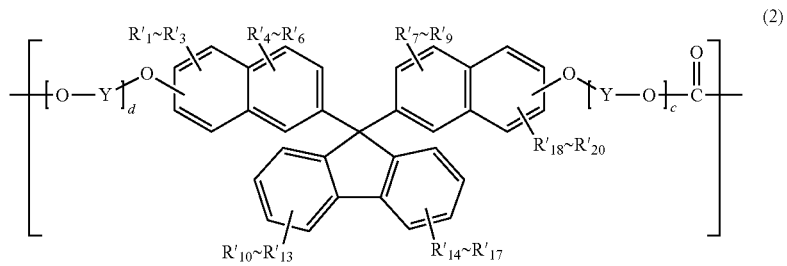

(2)

(where $R'_1$ through $R'_{20}$ independently represent a hydrogen atom, a fluorine atom, a chlorine atom, a bromine atom, an iodine atom, an alkyl group having a carbon number of 1 to 6, an aryl group having a carbon number of 6 to 12, an alkenyl group having a carbon number of 2 to 6, an alkoxy group having a carbon number of 1 to 6, or an aralkyl group having a carbon number of 7 to 17;

Y represents an alkylene group having a carbon number of 1 to 8, a cycloalkylene group having a carbon number of 5 to 12, or an arylene group having a carbon number of 6 to 20; and c and d each represent an integer of 1 to 10);

[Chemical formula 10]

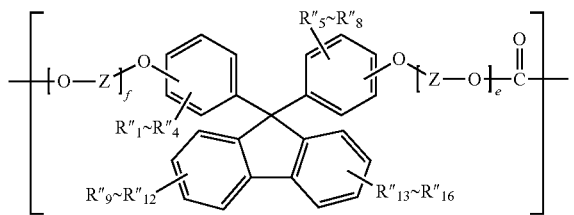

(3)

(where $R''_1$ through $R''_{16}$ independently represent a hydrogen atom, a fluorine atom, a chlorine atom, a bromine atom, an iodine atom, an alkyl group having a carbon number of 1 to 6, an aryl group having a carbon number of 6 to 12, an alkenyl group having a carbon number of 2 to 6, an alkoxy group having a carbon number of 1 to 6, or an aralkyl group having a carbon number of 7 to 17;

Z represents an alkylene group having a carbon number of 1 to 8, a cycloalkylene group having a carbon number of 5 to 12, or an arylene group having a carbon number of 6 to 20; and e and f each represent an integer of 1 to 10).

7. The polycarbonate resin according to claim 6, wherein the polycarbonate resin includes a copolymer that includes at least the structural unit expressed by general formula (1) and the structural unit expressed by general formula (2).

8. The polycarbonate resin according to claim 7, wherein the copolymer further includes a structural unit expressed by general formula (3-1) below:

[Chemical formula 11]

(3-1)

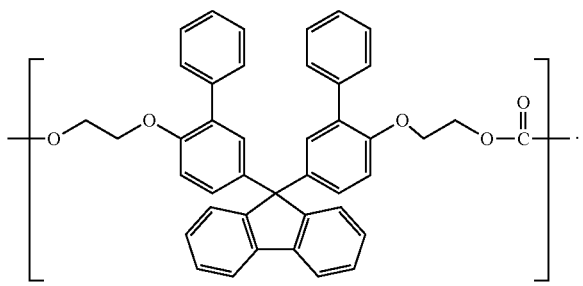

9. The polycarbonate resin according to claim 6, wherein the polycarbonate resin includes a copolymer that includes at least the structural unit expressed by general formula (1) and the structural unit expressed by general formula (3).

10. The polycarbonate resin according to claim 9, wherein the copolymer further includes a structural unit expressed by general formula (2-1) below:

[Chemical formula 12]

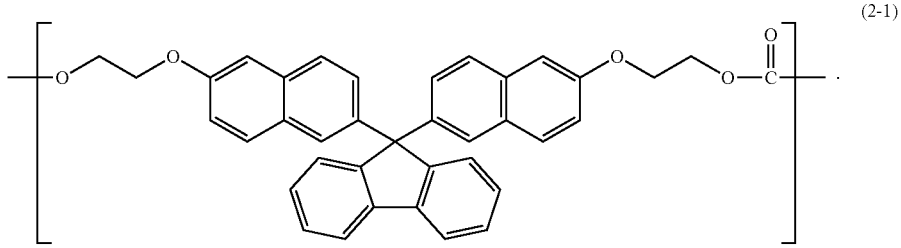

(2-1)

11. The polycarbonate resin according to claim 1, wherein the polycarbonate resin includes the structural units expressed by general formulas (1) and (2) at 20 to 80 mol % in total.

12. The polycarbonate resin according to claim 1, further comprising at least one of structural units expressed by general formula (4) below:

[Chemical formula 13]

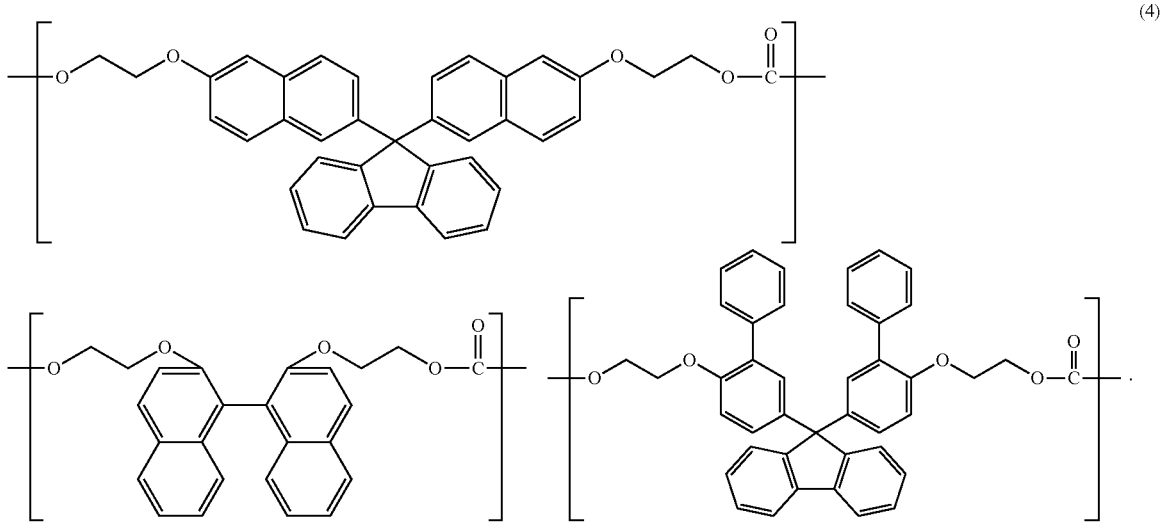

(4)

13. The polycarbonate resin according to claim 12, comprising at least a structural unit of BNEF (9,9-bis(6-(2-hydroxyethoxy)naphthalene-2-yl)fluorene).

14. The polycarbonate resin according to claim 12, comprising at least a structural unit of 2,2'-bis(2-hydroxyethoxy)-1,1'-binaphthalene.

15. The polycarbonate resin according to claim 12, further comprising at least a structural unit of BPPEF (9,9-bis(4-(2-hydroxyethoxy)-3-phenylphenyl)fluorene).

16. The polycarbonate resin according to claim 1, wherein the aryl group is selected from pyrenyl group, furanyl group, benzodioxanyl group, dihydrobenzofuranyl group, piperonyl group, benzofuranyl group, dibenzofuranyl group, pyrrolidinyl group, isoquinolyl group, pyrimidinyl group, and carbazole group, which may be substituted by an alkyl group having a carbon number of 1 to 6, an alkoxy group having a carbon number of 1 to 6, or an aryl group having a carbon number of 6 to 16.

17. The polycarbonate resin according to claim 1, wherein the polycarbonate resin has a value of refractive index of 1.655 or greater.

18. The polycarbonate resin according to claim 1, where $R_1$ and $R_2$ are identical.

19. The polycarbonate resin according to claim 1, where $R_1$ and $R_2$ are identical or different and selected from mono- or polycyclic aryl having from 6 to 36 carbon atoms and mono- or polycyclic hetaryl having a total of 5 to 36 atoms, which are ring members, where 1, 2, 3 or 4 of these atoms are selected from nitrogen, sulfur and oxygen, while the remainder of these atoms are carbon atoms,
where mono- or polycyclic aryl and mono- or polycyclic hetaryl are unsubstituted.

20. The polycarbonate resin according to claim 1, where $R_1$ and $R_2$ are selected from the group consisting of
azulenyl,
indenyl, which is unsubstituted or substituted by 1, 2, 3, 4 or 5 radicals selected from phenyl and polycyclic aryl bearing bearing 2, 3 or 4 phenyl rings, which are linked to each other via a single bond, directly fused to each other and/or fused to a saturated or unsaturated 4- to 10-membered mono- or bicyclic hydrocarbon ring;
phenyl, which is unsubstituted;
phenyl, which is substituted by 1 or 2 CN radicals;
phenyl, which is substituted by 1, 2, 3, 4 or 5 radicals selected from phenyl and polycyclic aryl bearing bearing 2, 3 or 4 phenyl rings, which are linked to each other via a single bond, directly fused to each other and/or fused to a saturated or unsaturated 4- to 10-membered mono- or bicyclic hydrocarbon ring; and polycyclic aryl bearing 2, 3 or 4 phenyl rings, which are directly fused to each other and/or fused to a saturated or unsaturated 4- to 10-membered mono- or bicyclic hydrocarbon ring, where polycyclic aryl is unsubstituted or substituted by 1 or 2 radicals selected from phenyl and polycyclic aryl bearing 2 or 3 phenyl rings, which are linked to each other via a single bond, directly fused to each other and/or fused to a saturated 4- to 10-membered mono- or bicyclic hydrocarbon ring, where the phenyl rings of polycyclic aryl are unsubstituted or carry 1 or 2 radicals Ra.

21. The polycarbonate resin according to claim 1, where $R_1$ and $R_2$ are selected from the group consisting of
    phenyl, which is unsubstituted or substituted by 1, 2, 3, 4 or 5 phenyl radicals,
    phenyl, which is substituted by 1 or 2 CN radicals,
    phenyl, which is substituted by 1 or 2 polycyclic aryl radicals selected from biphenyl, naphthyl, fluorenyl, anthracenyl, phenanthryl and pyrenyl and optionally by 1 further phenyl radical;
    naphthyl, which is unsubstituted or substituted by 1 or 2 radicals selected from CN, phenyl and polycyclic aryl selected from biphenyl, naphthyl, fluorenyl, anthracenyl, phenanthryl and pyrenyl;
    biphenylenyl;
    triphenylenyl;
    tetraphenylenyl;
    phenanthryl;
    pyrenyl;
    9H-fluorenyl;
    dibenzo[a,e][8]annulenyl;
    perylenyl; and
    9,9'-spirobi[9H-fluoren]yl.

22. The polycarbonate resin according to claim 21, where $R_1$ and $R_2$ are selected from the group consisting of phenyl, 2-cyanophenyl, 3-cyanophenyl, 4-cyanophenyl, 2-naphthyl, 1-naphthyl, and 9-phenanthryl.

23. The polycarbonate resin according to claim 1, where $R_1$ and $R_2$ are selected from the group consisting of
    heteroaromatic monocyclic radicals having 5 or 6 ring atoms, which comprise 1, 2, 3 or 4 nitrogen atoms or 1 oxygen atom and 0, 1, 2 or 3 nitrogen atoms or 1 sulfur atom and 0, 1, 2 or 3 nitrogen atoms, where the remainder of the ring atoms are carbon atoms,
    heteroaromatic polycyclic radicals, which bear a heteroaromatic monocycle as defined above and 1, 2, 3, 4 or 5 further aromatic rings selected from phenyl and heteroaromatic monocycles, where the (hetero)aromatic rings of polycyclic hetaryl are linked to each other by a covalent bond or fused to each other directly and/or fused to a saturated or unsaturated 4 to 10-membered mono- or bicyclic hydrocarbon ring; and
    heteroaromatic polycyclic radicals, which bear at least one saturated or partially unsaturated 5- or 6-membered heterocyclic ring bearing 1 or 2 heteroatoms selected from oxygen, sulfur and nitrogen as ring atoms, and 1, 2, 3, 4 or 5 further aromatic rings selected from phenyl and heteroaromatic monocycles as defined above, where at least one of the further aromatic rings is directly fused to the saturated or partially unsaturated 5- or 6-membered heterocyclic radical and where the remainder of further aromatic rings of polycyclic hetaryl are linked to each other by a covalent bond or fused to each other directly and/or fused to a saturated or unsaturated 4 to 10-membered mono- or bicyclic hydrocarbon ring.

24. The polycarbonate resin according to claim 23, where $R_1$ and $R_2$ are selected from the group consisting of furyl, thienyl, pyrrolyl, imidazolyl, pyrazolyl, 1,2,3-triazolyl, 1,2,4-triazolyl, tetrazolyl, oxazolyl, isoxazolyl, 1,3,4-oxadiazolyl, 1,2,4-oxadiazolyl, pyridyl, pyrazinyl, pyridazinyl, pyrimidinyl, triazinyl, benzofuryl, dibenzofuranyl, benzothienyl, dibenzothienyl, thianthrenyl, naphthofuryl, furo[3,2-b]furanyl, furo[2,3-b]furanyl, furo[3,4-b]furanyl, oxanthrenyl, indolyl, isoindolyl, carbazolyl, indolizinyl, benzopyrazolyl, benzimidazolyl, benzoxazolyl, benzo[cd]indolyl, 1H-benzo[g]indolyl, quinolinyl, isoquinolinyl, acridinyl, phenazinyl, quinazolinyl, quinoxalinyl, phenoxazinyl, benzo[b][1,5]naphthyridinyl, cinnolinyl, 1,5-naphthyridinyl, 1,8-naphthyridinyl, phenylpyrrolyl, naphthylpyrrolyl, dipyridyl, phenylpyridyl, naphthylpyridyl, pyrido[4,3-b]indolyl, pyrido[3,2-b]indolyl, pyrido[3,2-g]quinolinyl, pyrido[2,3-b][1,8]naphthyridinyl, pyrrolo[3,2-b]pyridinyl, pteridinyl, puryl, 9H-xanthenyl, 2H-chromenyl, phenanthridinyl, phenanthrolinyl, furo[3,2-f][1]benzofuranyl, furo[2,3-f][1]benzofuranyl, furo[3,2-g]quinolinyl, furo[2,3-g]quinolinyl, furo[2,3-g]quinoxalinyl, benzo[g]chromenyl, pyrrolo[3,2,1-hi]indolyl, benzo[g]quinoxalinyl, benzo[f]quinoxalinyl, and benzo[h]isoquinolinyl.

25. The polycarbonate resin according to claim 1, where X is ethylene group.

26. An optical lens, comprising the polycarbonate resin according to claim 1.

27. A method for producing the polycarbonate resin of claim 1, including performing melt polycondensation of a dihydroxy compound represented by general formula (5) and a carbonate diester,

[Chemical formula 14]

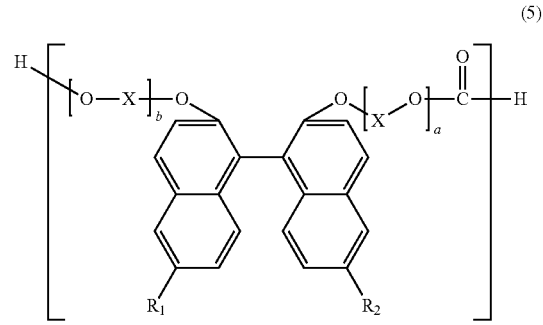

(5)

(in formula (5), $R_1$ and $R_2$ independently represent a hydrogen atom, a fluorine atom, a chlorine atom, a bromine atom, an iodine atom, an alkyl group having a carbon number of 1 to 6, a mono- or polycyclic aryl group having a carbon number of 6 to 36, a mono- or polycyclic hetaryl having a total of 5 to 36 atoms, which are ring members, where 1, 2, 3 or 4 of these atoms are selected from nitrogen, sulfur and oxygen, while the remainder of these atoms are carbon atoms, an alkenyl group having a carbon number of 2 to 6, an alkoxy group having a carbon number of 1 to 6, or an aralkyl group having a carbon number of 7 to 17, where mono- or polycyclic aryl and mono- or polycyclic hetaryl are unsubstituted or carry 1 or 2 radicals Ra, which are selected from the group consisting of CN, $CH_3$, $OCH_3$, O-phenyl, O-naphthyl, S-phenyl, S-naphthyl and halogen, where $R_1$ and $R_2$ are not all a hydrogen atom;

X represents an alkylene group having a carbon number of 1 to 8, a cycloalkylene group having a carbon number of 5 to 12 or an arylene group having a carbon number of 6 to 20;

where alkylene group and cycloalkylene group are unsubstituted or carry a phenyl ring, and a and b are each an integer of 1 to 10).

* * * * *